US012292840B2

(12) United States Patent
Kakaiya et al.

(10) Patent No.: US 12,292,840 B2
(45) Date of Patent: May 6, 2025

(54) SECURE DIRECT PEER-TO-PEER MEMORY ACCESS REQUESTS BETWEEN DEVICES

(71) Applicant: Intel Corporation, Santa Clara, CA (US)

(72) Inventors: Utkarsh Y. Kakaiya, Folsom, CA (US); Rajesh Sankaran, Portland, OR (US); David Koufaty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 17/352,631

(22) Filed: Jun. 21, 2021

(65) Prior Publication Data

US 2022/0405212 A1 Dec. 22, 2022

(51) Int. Cl.
*G06F 12/14* (2006.01)
*G06F 12/1009* (2016.01)

(52) U.S. Cl.
CPC ...... *G06F 12/1458* (2013.01); *G06F 12/1009* (2013.01); *G06F 12/1425* (2013.01); *G06F 12/145* (2013.01); *G06F 2212/1052* (2013.01)

(58) Field of Classification Search
CPC ............. G06F 12/1458; G06F 12/1009; G06F 12/1425; G06F 12/145; G06F 2212/1052; G06F 12/0875; G06F 12/1483; G06F 21/79; G06F 13/4221; G06F 2213/0024
USPC .................................................. 711/163, 154
See application file for complete search history.

(56) References Cited

U.S. PATENT DOCUMENTS 4,648,030 A * 3/1987 Bomba .................. G06F 13/36 902/39
2006/0143311 A1* 6/2006 Madukkarumukumana ............... G06F 13/28 710/1
2019/0042455 A1* 2/2019 Agarwal ............. G06F 13/4022
2020/0019515 A1* 1/2020 Koufaty .............. G06F 12/1483
2021/0026543 A1 1/2021 Trikalinou et al.
2021/0132999 A1* 5/2021 Haywood ............... G06F 9/544

OTHER PUBLICATIONS

"Intel Virtualization Technology for Directed I/O", Architecture Specification, Mar. 2023, Revision 4.1, 326 pgs.

* cited by examiner

*Primary Examiner* — Hosain T Alam
*Assistant Examiner* — Zubair Ahmed
(74) *Attorney, Agent, or Firm* — Essential Patents Group, LLP

(57) ABSTRACT

An embodiment of an integrated circuit comprises circuitry to store memory protection information for a non-host memory in a memory protection cache, and perform one or more memory protection checks on a translated access request for the non-host memory based on the stored memory protection information. Other embodiments are disclosed and claimed.

19 Claims, 19 Drawing Sheets

200

221 Store memory protection information for a non-host memory in a MPC

222 Perform one or more memory protection checks on a translated access request for the non-host memory based on the stored memory protection information 223 Synchronize the stored memory protection information with a MPU of a host

B

490

| Domain-ID | Source-RID | PASID info | Permissions | HPA | State |
|---|---|---|---|---|---|
| Domain-ID | Source-RID | PASID info | Permissions | HPA | State |
| Domain-ID | Source-RID | PASID info | Permissions | HPA | State |
| ... | ... | ... | ... | ... | ... |

- Source-RID: Source Requester-ID
- PASID info: PASID valid bit and PASID value (if valid)
- Permissions: Page permissions (R, W, ...)
- HPA: Host physical address of the page
- State: Cache entry state

- [1, 2, 3]: Direct P2P Request
- [4, 5, 6]: Retry Response to Direct P2P Request
- [a, b, c]: Second iteration of Direct P2P Request

- [1]: IO-MPU Requesting MPC Invalidation
- [2, 3]: MPC Invalidation Request
- [4, 5]: MPC Invalidation Response
- [6]: IO-MPU Receiving Response for MPC Invalidation

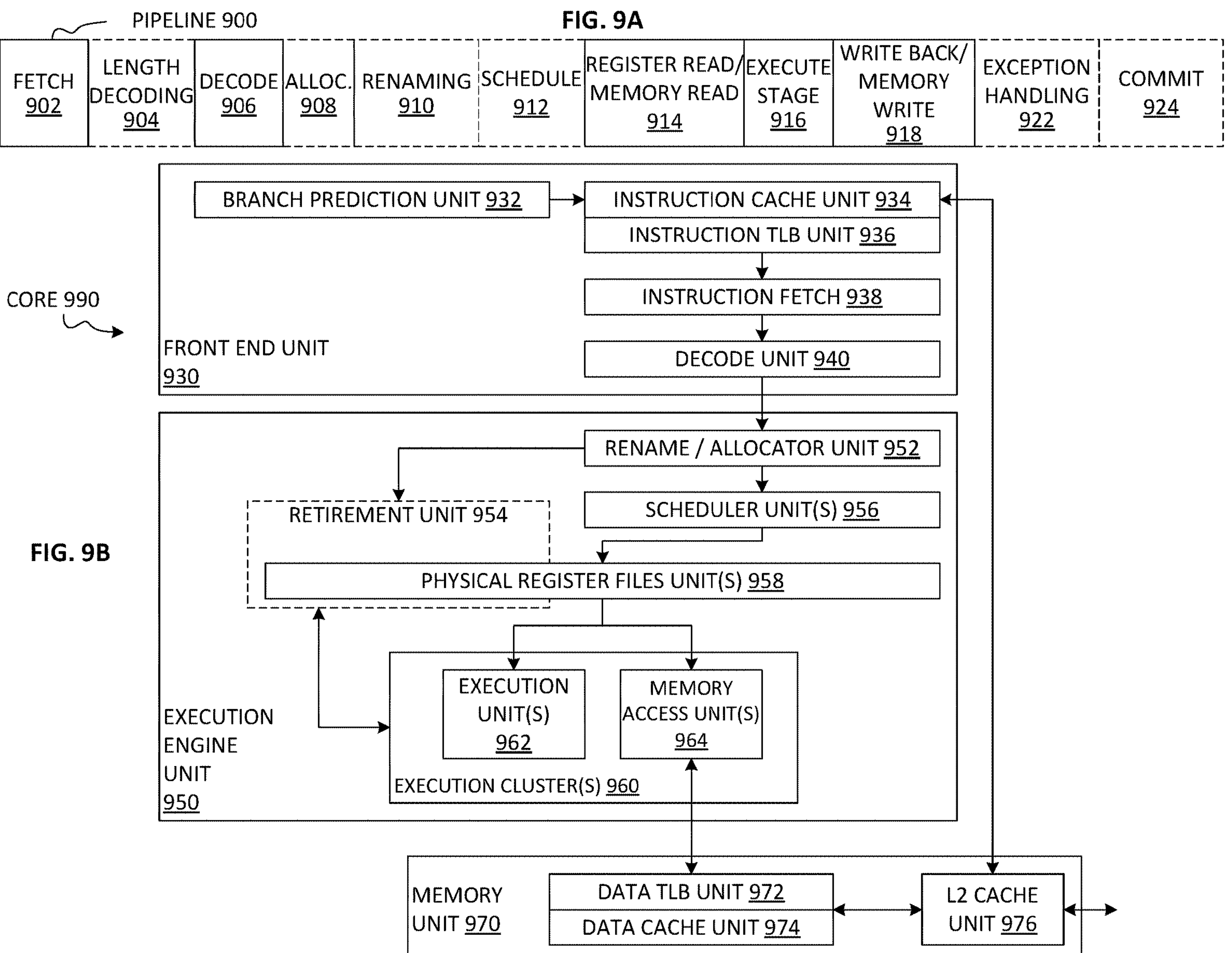

PIPELINE 900
FIG. 9A
FETCH 902
LENGTH DECODING 904
DECODE 906
ALLOC. 908
RENAMING 910
SCHEDULE 912
REGISTER READ/ MEMORY READ 914
EXECUTE STAGE 916
WRITE BACK/ MEMORY WRITE 918
EXCEPTION HANDLING 922
COMMIT 924
BRANCH PREDICTION UNIT 932
INSTRUCTION CACHE UNIT 934
INSTRUCTION TLB UNIT 936
CORE 990
INSTRUCTION FETCH 938
FRONT END UNIT 930
DECODE UNIT 940
RENAME / ALLOCATOR UNIT 952
RETIREMENT UNIT 954
SCHEDULER UNIT(S) 956
FIG. 9B
PHYSICAL REGISTER FILES UNIT(S) 958
EXECUTION UNIT(S) 962
MEMORY ACCESS UNIT(S) 964
EXECUTION ENGINE UNIT 950
EXECUTION CLUSTER(S) 960
MEMORY UNIT 970
DATA TLB UNIT 972
DATA CACHE UNIT 974
L2 CACHE UNIT 976

SECURE DIRECT PEER-TO-PEER MEMORY ACCESS REQUESTS BETWEEN DEVICES

BACKGROUND

1. Technical Field

This disclosure generally relates to memory technology, and more particularly to memory management technology.

2. Background Art

Most modern computer systems use memory virtualization for optimal memory usage and security. Traditionally, Peripheral Component Interconnect Express (PCIe) devices would only observe untranslated addresses instead of a Host Physical Addresses (HPA), and would send a read or write request with a given untranslated address. On the host side, the processor's input/output memory management unit (IOMMU) would receive a read/write request from a device, translate the specified address to an HPA and complete the device's memory access (read/write). In order to isolate devices only to specific addresses, software would program the device and the IOMMU to use untranslated address that are, for example, a Virtual Address (VA), a Guest Physical Address (GPA) or an Input/Output Virtual Address (IOVA). The HPA is the physical address used to access all platform resources, after all address translations have taken place, including any translation from GPA to HPA or from Guest Virtual Address (GVA) to GPA to HPA or Guest Input/Output Virtual Address (GIOVA) to GPA to HPA in a virtualized environment, and it is usually referred simply as a Physical Address (PA) in a non-virtualized environment.

Address Translation Services (ATS) is an extension to the PCIe protocol. The current version of ATS is part of the PCIe specification, which is maintained by the PCI Special Interest Group (PCI-SIG) and which can be accessed by members at https://pcisig.com/specifications/ may be referred to herein as the "ATS Specification". ATS among other things, allows devices to cache address translations and to handle page faults (traditional PCIe devices required memory pinning), which facilitates support for a variety of features, including Device Translation Lookaside Buffer (Dev-TLB) and Shared Virtual Memory. ATS also provides support for cache-coherent links like Computer Express Link (CXL) cache protocol that operate exclusively on physical address. ATS allows a PCIe device to request address translations, for example, from VA to HPA, from a translation agent (e.g., the IOMMU). This capability allows the device to store the resulting translations internally in a Dev-TLB, also referred to by the ATS Specification as an address translation cache (ATC), and directly use the resulting HPA to subsequently access main memory, via a host-to-device link (e.g., a PCIe interface or a cache-coherent interface (e.g., CXL, NVLink, and Cache Coherent Interconnect for Accelerators (CCIX)). As such, ATS splits a legacy PCIe memory access into multiple stages, including (i) a Translation Request in which the device requests a translation for a VA to a HPA; (ii) a Translated Request in which the device requests a read/write with a given HPA; and (iii) an optional Page Request in which the device makes a request to the IOMMU for a new page to be allocated for it after a failed Translation Request.

BRIEF DESCRIPTION OF THE DRAWINGS

The various embodiments of the present invention are illustrated by way of example, and not by way of limitation, in the figures of the accompanying drawings and in which:

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1A:
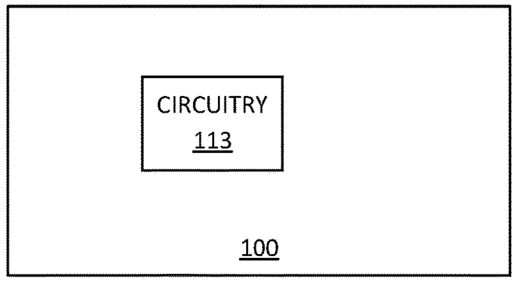
FIG. 1A is a block diagram of an example of an integrated circuit according to an embodiment.

Embodiments discussed herein variously provide techniques and mechanisms for a memory protection cache (MPC). The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to perform one or more memory protection checks on a translated access request for a non-host memory based on memory protection information stored in a MPC.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device. As used herein, the term "device" may also refer generally to an input/output source or target (e.g., source device, target device, etc.).

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

With reference to FIG. 1A, an embodiment of an integrated circuit 100 may include circuitry 113 configured to store memory protection information for a non-host memory in a memory protection cache (MPC), and perform one or more memory protection checks on a translated access request for the non-host memory based on the stored memory protection information. For example, the non-host memory may correspond to local device memory, a memory pool, a remote memory pool, etc. In some embodiments, the circuitry 113 may be further configured to synchronize the stored memory protection information with a memory protection unit (MPU) of a host (e.g., an input/output MPU (IO-MPU)). For example, the circuitry 113 may be configured to provide secure direct peer-to-peer (P2P) memory access to the non-host memory without intervention by the host (e.g., to bypass a root port of the host for the translated access request for the non-host memory), and/or to block or allow a direct P2P memory access request for the non-host memory based on the memory protection information stored in the MPC. In some embodiments, the circuitry 113 may be further configured to determine if the translated access request comes from the host and, if so determined, bypass the one or more memory protection checks on the translated access request. The circuitry 113 may also be configured to determine if the translated access request misses the MPC based on information received in the translated access request and, if so determined, request the MPU of the host to fill in memory protection information for the translated access request. For example, the circuitry 113 may be configured to notify a requestor to retry the translated access request that misses the MPC, along with hold-off information.

Figure 1B:
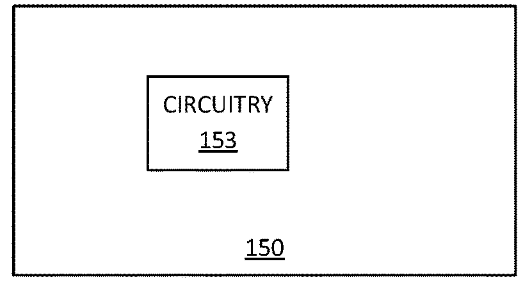
FIG. 1B is a block diagram of another example of an integrated circuit according to an embodiment.

With reference to FIG. 1B, an embodiment of an integrated circuit 150 may include circuitry 153 configured to store memory protection information for a host memory in an IO-MPU, and to synchronize the stored memory protection information with a MPC of a device communicatively coupled to the host (e.g., an I/O device). For example, the host memory may correspond to system memory, a main memory, etc. In some embodiments, the circuitry 153 may be further configured. For example, the circuitry 153 may be configured to receive a MPC fill request at the IO-MPU from the device, perform a host-permission table walk and validates access permissions at the IO-MPU, and return information from the IO-MPU to the device in a form of a MPC fill response. In some embodiments, the circuitry 153 may be further configured to receive a request at the IO-MPU from system software to invalidate MPC information. In response to the request, the circuitry 153 may be configured to generate a MPC invalidation request to the device, and to receive a MPC invalidation response from the device. For example, the circuitry 153 may also be configured to update tracking information and/or notify the system software about the MPC invalidation response.

Figure 2A:
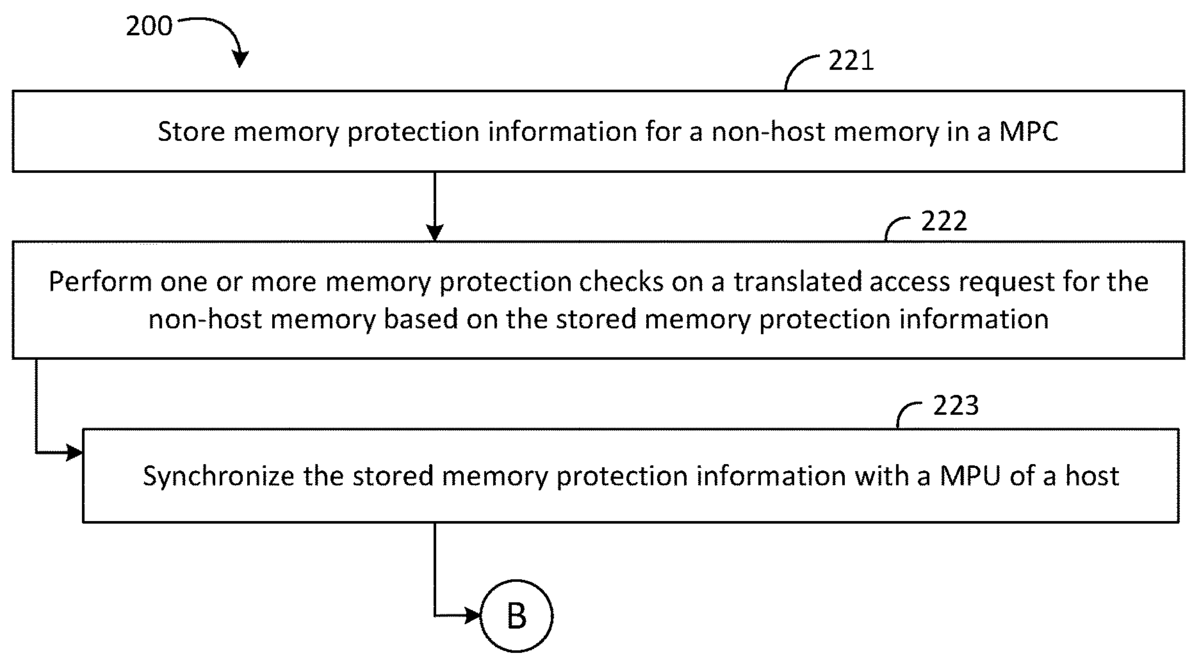
FIGS. 2A to 2B are flow diagrams of an example of a method according to an embodiment.
Figure 2B:
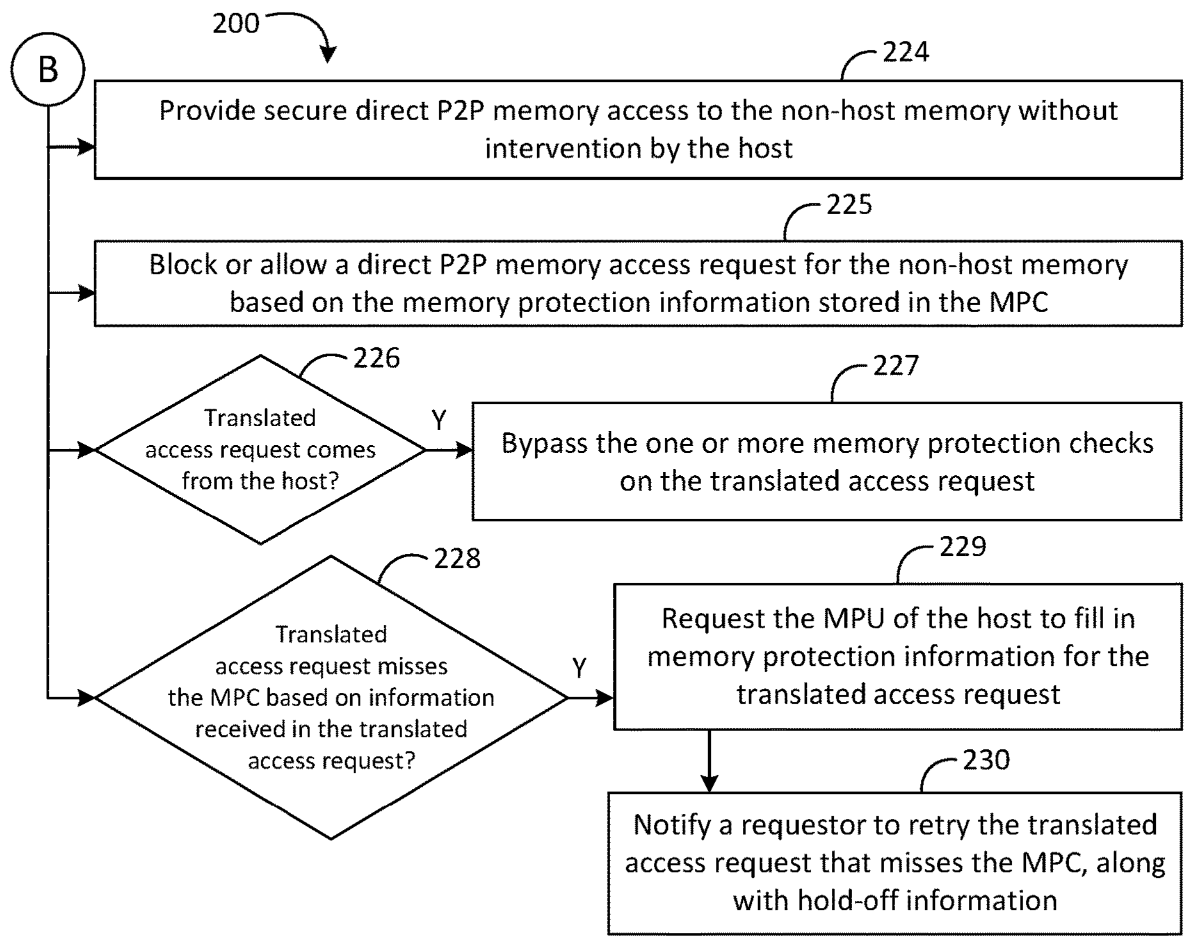

With reference to FIGS. 2A to 2B, an embodiment of a method 200 may include storing memory protection information for a non-host memory in a MPC at box 221, and performing one or more memory protection checks on a translated access request for the non-host memory based on the stored memory protection information at box 222. Some embodiments of the method 200 may further include synchronizing the stored memory protection information with a MPU of a host at box 223. For example, the method 200 may include providing secure direct P2P memory access to the non-host memory without intervention by the host at box 224 (e.g., bypassing a root port of the host for the access request for the non-host memory), and/or blocking or allowing a direct P2P memory access request for the non-host memory based on the memory protection information stored in the MPC at box 225. Some embodiments of the method 200 may further include determining if the translated access request comes from the host at box 226 and, if so determined, bypassing the one or more memory protection checks on the translated access request at box 227. The method 200 may also include determining if the translated access request misses the MPC based on information received in the translated access request at box 228 and, if so determined, requesting the MPU of the host to fill in memory protection information for the translated access request at box 229. For example, the method 200 may include notifying a requestor to retry the translated access request that misses the MPC, along with hold-off information at box 230.

Figure 3:
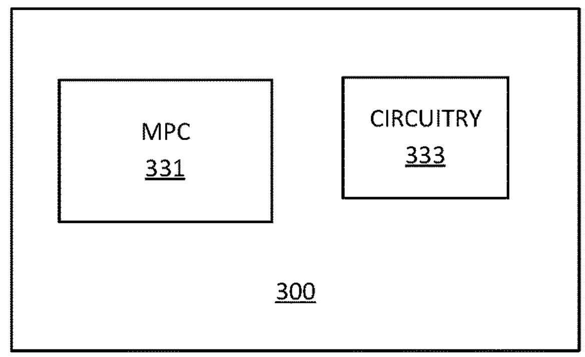
FIG. 3 is a block diagram of an example of an apparatus according to an embodiment.

With reference to FIG. 3, an embodiment of an apparatus 300 may include a MPC 331 to store memory protection information for a non-host memory, and circuitry 333 coupled to the MPC 331 to perform one or more memory protection checks on a translated access request for the non-host memory based on the stored memory protection information. For example, the non-host memory may correspond to local device memory, a memory pool, a remote memory pool, etc. In some embodiments, the circuitry 333 may be further configured to synchronize the stored memory protection information with a MPU of a host (e.g., an IO-MPU). For example, the circuitry 333 may be configured to provide secure direct P2P memory access to the non-host memory without intervention by the host (e.g., to bypass a root port of the host for the translated access request for the non-host memory), and/or to block or allow a direct P2P memory access request for the non-host memory based on the memory protection information stored in the MPC 331. In some embodiments, the circuitry 333 may be further configured to determine if the translated access request comes from the host and, if so determined, bypass the one or more memory protection checks on the translated access request. The circuitry 333 may also be configured to determine if the translated access request misses the MPC based on information received in the translated access request and, if so determined, request the MPU of the host to fill in memory protection information for the translated access request. For example, the circuitry 333 may be configured to notify a requestor to retry the translated access request that misses the MPC, along with hold-off information.

Some embodiments provide technology for secure direct P2P memory access requests between devices. Embodiments of a distributed secure address translation service (ATS) architecture may include technology to enable high-performance direct P2P communication between Peripheral Component Interconnect Express (PCIe) and/or Computer Express Link (CXL) devices while maintaining a higher-security bar associated with vetting translated memory requests. Conventionally, P2P memory requests are host-reflected/bounced (e.g., by configuring access control services (ACS) settings throughout the input/output (I/O) hierarchy) in order to perform memory protection checks. A problem is that the host-reflected/bounced P2P memory requests create an I/O bottleneck (e.g., especially for highly populated I/O hierarchies), increase end-to-end latency for P2P traffic, and don't scale well for a disaggregated cloud platform.

Some embodiments overcome one or more of the foregoing problems with technology for a distributed secure ATS architecture that enables extensions to build a MPC closer to the device memory/pool to perform memory protection checks. Some embodiments also provide technology for a protocol and/or messages to keep the MPC in-sync with an IO-MPU residing inside of a host (e.g., a SoC device including a central processor unit (CPU) and a Root Complex). Advantageously, some embodiments of a distributed secure ATS architecture may remove the need to host-reflect/bounce translated memory requests, thereby improving latency and performance associated with the P2P memory requests and also enabling secure direct-P2P communication.

Figure 4A:
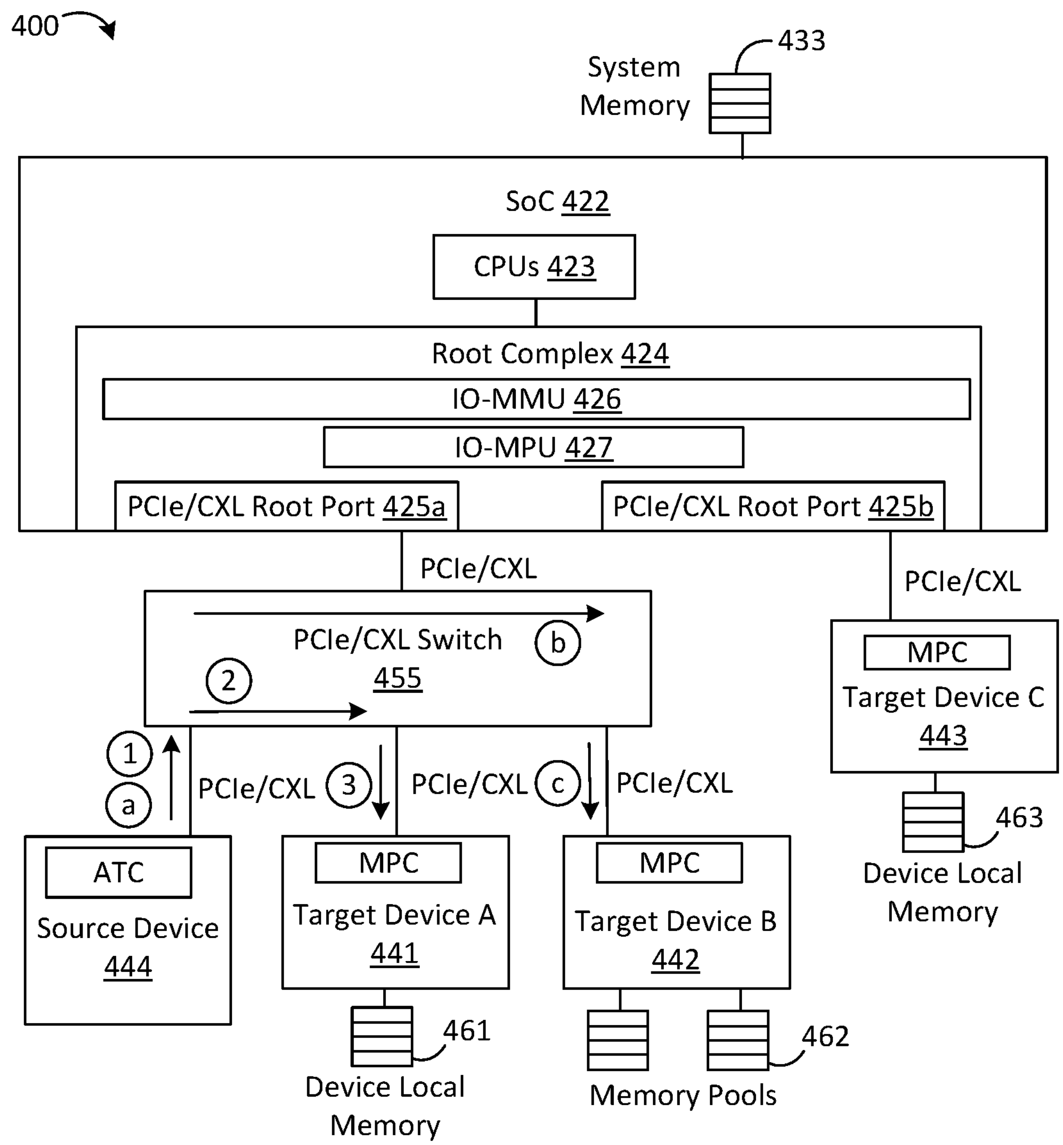
FIG. 4A is a block diagram of an example of a distributed computing system according to an embodiment.

With reference to FIG. 4A, an embodiment of a distributed computing system 400 includes an SoC host device 422 coupled to system memory 433. The host device 422 includes one or more CPUs 423 communicatively coupled to a root complex 424. The root complex 424 includes two or more root ports 425*a* and 425*b* (collectively root ports 425), an I/O memory management unit (IOMMU) 426, and an IO-MPU 427. For example, the host device 422 and the root complex 424 may support PCIe and CXL communication interfaces. The host device 422 may be communicatively coupled to an I/O hierarchy that may have one or more I/O devices or accelerators with local memory/pools. For example, the system 400 may correspond to a cloud platform with disaggregated components that include one or more external devices 441 to 444 directly through the root ports 425 and/or through one or more switches 455. For example, the connected devices 441 to 444 and/or switches 455 may also support the PCIe and CXL communication interfaces. As illustrated, devices 444, 441, and 442 are connected to the host device 422 via the switch 455, while device 443 is directly connected to a root port 425*b*. Various of the devices 441 to 444 may provide access to non-host memory such as device local memory 461 and 463 and memory pools 462 (collectively non-host memory).

In some embodiments, the root complex includes an IOMMU 426 that provides DMA remapping and interrupt remapping capabilities, the PCIe/CXL root ports 425 that connect the I/O hierarchy, and an IO-MPU 427 that validates permissions for translated DMA requests. In some embodiments, the IO-MPU 427 may be implemented inside of the IOMMU 426.

In an example operation, the device 441 may be a target device A with the device local memory 461 (e.g., a graphic processing unit (GPU), a field programmable gate array (FPGA), etc.), the device 442 may be a target device B with the memory pools 462, the device 443 may be a target device C with the device local memory 463 (e.g., another I/O or accelerator device), and the device 444 may be a source device.

In an example scenario, the source device 444 generates a P2P request to a target device. Untranslated P2P requests go through the switch 455 and have an address translation (AT) attribute set as 00*b*. The PCIe/CXL switch 455 sends the untranslated P2P requests upstream to ensure that the requests get translated by a translation agent (e.g., the IOMMU 426) before getting redirected to the target device. Sending the untranslated requests upstream ensures that both devices are talking the same language and the root complex 424 can perform address translation and access checks as necessary. To handle the needed translations, system software may set (0x1) ACS control fields (e.g., ACS P2P Request Redirect Enable, ACS P2P Completion Redirect Enable, etc.) throughout the I/O hierarchy.

In order to provide secure ATS, the IO-MPU 427 validates translated requests (e.g., utilizing a permission table) before allowing the translated requests to proceed to the memory fabric or directing them to an I/O fabric. The IO-MPU 427 will validate that the physical address in translated requests is allowed by the host. In some embodiments, the IO-MPU 427 uses a set of tables that specify the permissions that a device can have for each physical page. If the IO-MPU 427 determines that the access is permitted, the IO-MPU 427 allows the translated request to proceed to its destination. Otherwise, the IO-MPU 427 blocks the access.

In a conventional system, all translated P2P requests still need to be directed to the host to perform the address checks. System software achieves this by clearing (OxO) an ACS control field "ACS Direct Translated P2P Enable" throughout the I/O hierarchy. For example, a source device sends a translated request for a conventional target device with AT=10b, the PCIe/CXL switch 455 receives the incoming request from the downstream port and directs it upstream, the request arrives through the PCIe/CXL root port 425*a* and the IO-MPU 427 performs a permissions check to ensure that the requested memory access is allowed. After a successful verification, the root-complex 424 redirects the request downstream (presuming that the address being accessed is falling within the range of memory exposed by the conventional target device), the PCIe/CXL switch 455 receives this request and then passes it down to the conventional target device. A similar flow may be utilized when the source device makes a DMA request to a conventional target device B located as a peer-device.

To summarize, a conventional target device may receive three types of requests including: 1) Untranslated requests originated from the CPU cores 423 (e.g., Source RID=Root Port RID, AT=00b); 2) Untranslated requests that originated from a peer device, reflected/routed/bounced to the SoC 422 for address translation and then re-directed to the conventional target device (e.g., Source RID=Root Port RID, AT=00b); and 3) Translated requests that originated from the peer device, reflected/routed/bounced to the SoC 422 for secure ATS and/or IO-MPU 427 checks, and then directed to the conventional target device (e.g., Source RID=Root Port RID, AT=10b or 00b). Some root-complexes may convert the AT type from 10b to 00b as translated requests are sent downstream to a conventional target device, and other root-complexes may keep the AT type as-is as 10*b*.

Any transaction that reaches the SoC/Host device 422 and gets directed to the peer device I/O fabric is referred as a host-reflected/bounced transaction herein. A problem with going to the host for performing memory protection checks for a disaggregated architecture is that the host check may create an I/O bottlenecks and increase memory latency. Some embodiments advantageously provide technology extensions to enable high-performance secure direct P2P memory accesses for both disaggregated and heterogenous compute and I/O environments.

Some embodiments may provide a memory protection cache (MPC) that may be implemented on a device (e.g., closer to the device local memory, a memory pool, etc.) to perform memory protection checks on translated requests, thereby removing the need to bounce translated requests to a host device (e.g., a SoC). The MPC may be configured to interact with the host IO-MPU to acquire and then cache memory protection information locally on the device to enable high-performance P2P communication while also maintaining a higher-security bar associated with the secure ATS and/or IO-MPU architectures implemented by the host.

FIG. 4A shows an example platform with MPC extensions in accordance with some embodiments. Target devices A and B have a local MPC that is configured to cache the memory protection information from the IO-MPU 427 and vet the incoming translated requests. The source device 444 may follow the above flow of going to the SoC 422 to acquire the address translation information and caches the information in its device-translation lookaside buffer (TLB) (e.g., a local address translation cache (ATC)). However, the translated requests directed to the peer-device or to the peer-memory-pool may utilize an improved or optimized path (e.g., shown via 1-2-3 or a-b-c) that does not require the translated request to go to the SoC 422 for permission checks.

Figure 4B:
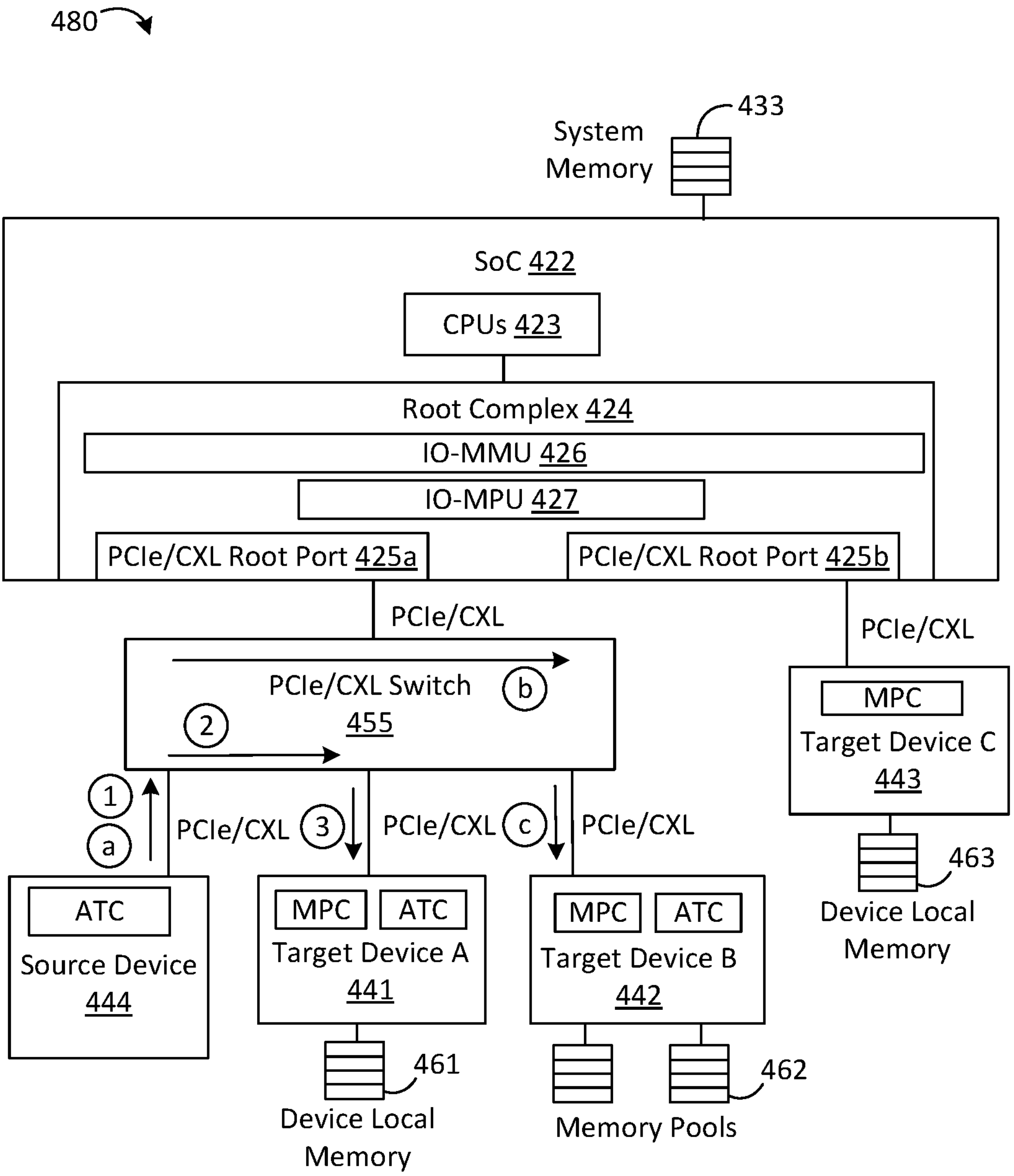
FIG. 4B is a block diagram of another example of a distributed computing system according to an embodiment.

With reference to FIG. 4B, an embodiment of a distributed computing system 480 may be similarly configured as the system 400. In this example, the device 442 (e.g., target device B) includes both an ATC and a MPC. The ATC is used to translate outbound requests (e.g., where the device 442 is a source device) while the MPC is used to validate inbound requests (e.g., where the device 442 is the target). Any of the devices in the system 480 may include an ATC and/or a MPC, as needed to support the function(s) of those devices.

Some embodiments may provide technology for a device to expose private memory or memory pool capabilities to implement a MPC that stores permissions associated with the memory. The device is configured to look-up the MPC cache to validate incoming memory read/write requests before the requests are allowed to reach memory. Requests that have successfully passed the permission checks proceed normally to read or write memory (as requested), and requests that fail permission checks are blocked from accessing the memory. In some embodiments, the MPC stores page-granular read and write permissions. In other embodiments, the MPC may store additional page-granular permissions (for example, execute permission).

Figure 4C:
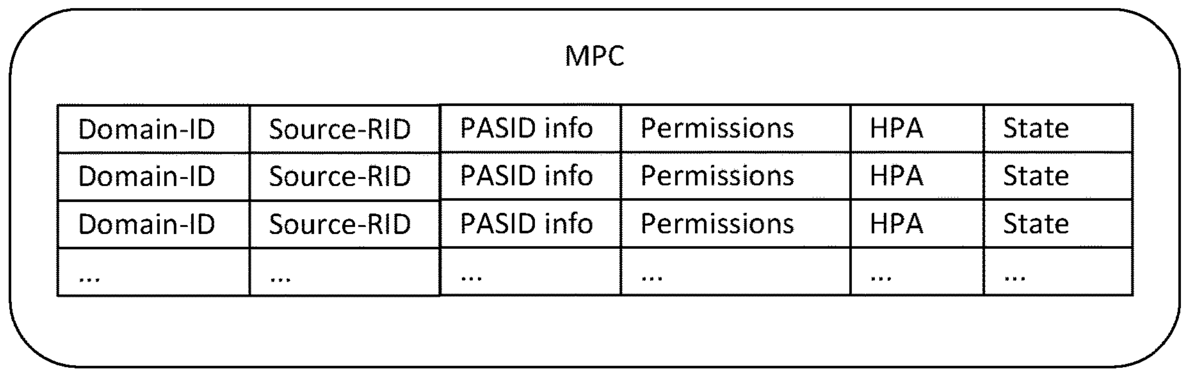
FIG. 4C is an illustrative diagram of an example of a memory protection cache structure according to respective embodiments.

FIG. 4C shows an embodiment of a MPC structure 490. In the structure 490, the MPC is configured to store page permissions at a Source Requester-ID granularity, a Requester-ID +Process Address Space ID (PASID) granularity, a Domain-ID granularity, or any combination thereof. Embodiments of this extension enable much finer grain protection/filtering where system software or an orchestration agent can allow direct-P2P requests from one-device but not from the other, or from a device-interface assigned to one software-domain but not from another software-domain/device-interface, etc.

Because the memory requests received by the target device can be (i) originated from a peer-device and directly sent to a target device (e.g., a direct P2P request from the source device 444 to the target device(s) A and/or B), (ii) originated from the CPU 423 or software running on the CPU 423, or (iii) originated from a peer-device but bounced to the CPU 423 (e.g., requests from the source device 444 to the target device C), some embodiments may provide technology to to bypass MPC checks (e.g., MPC checks may not be needed for target device C) if (1) the AT field in the request is not 10b, or (2) the Requester-ID received in the translated request matches a Requester-ID associated with the PCIe/CXL Root Port starting the PCIe/CXL hierarchy where the target device is connected. Some embodiments provide technology for system software to configure a PCIe/CXL Root Port Requester-ID value in the target device through a PCIe configuration capability (e.g., a MPC capability) or an MMIO mechanism.

Figure 5A:
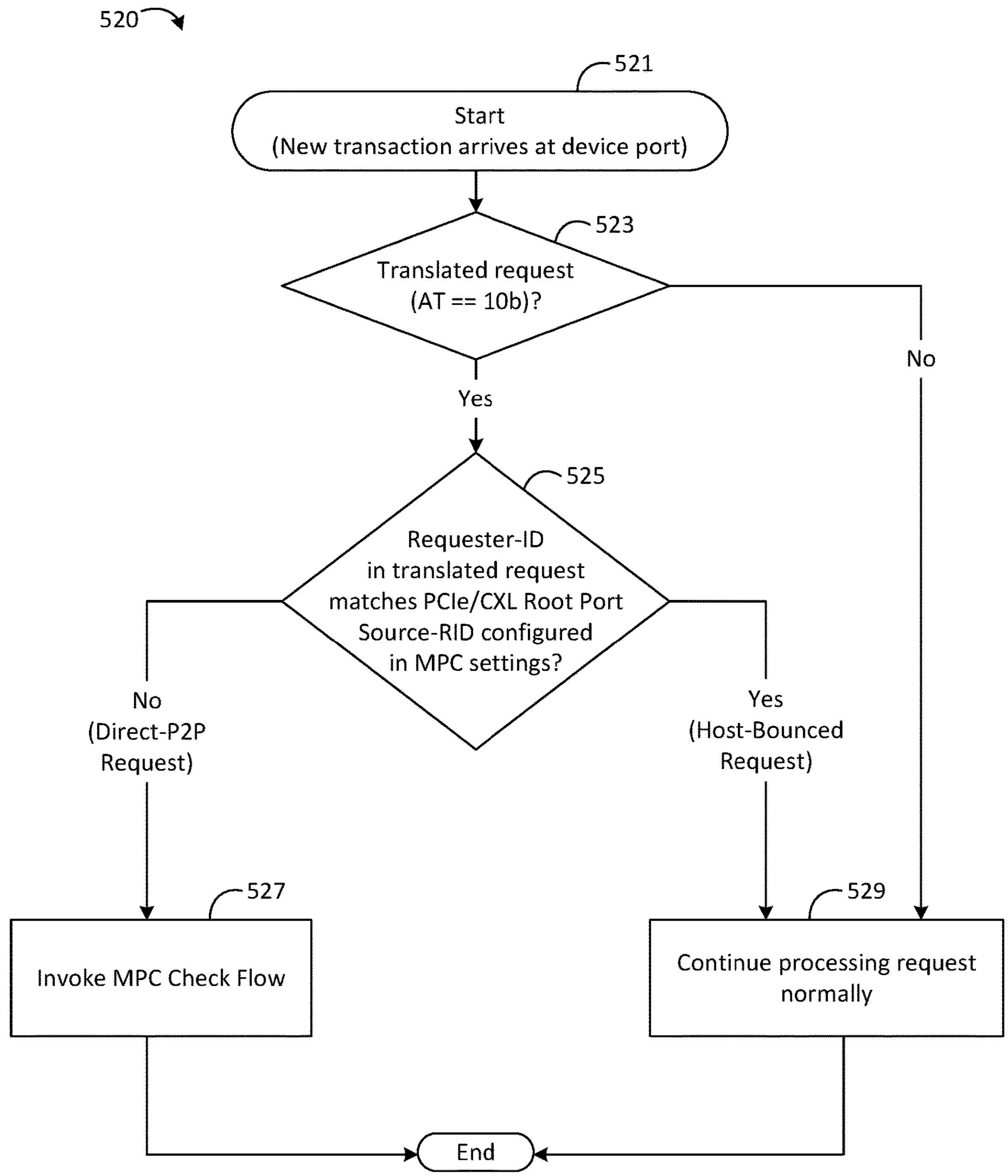
FIG. 5A is a flow chart of an example of a method according to an embodiment.

With reference to FIG. 5A, an embodiment of a method 520 may start at box 521 when a new transaction arrives at a target device port. On receipt of new memory request, the target device will decide if MPC checks are required are not. The target device makes this decision based on the AT field and Requester-ID field values received in the request. For example, if the AT field=10b at box 523 (indicating that the transaction corresponds to a translated request), the method 520 may next determine if the Requester-ID in the translated request matches a PCIe/CXL Root Port Source-RID configured in the MPC settings at box 525. If not (indicating a direct P2P request), the method 520 may procced to invoking a MPC check flow at box 527. Otherwise (indicating a host-bounced/reflected request), the method 520 may proceed to continue normal processing of the request at box 529. In the event that MPC checks are bypassed at box 529, the MPC is not looked up and memory read/write flows work as normal. If the target device determines that the MPC checks are necessary, the target device performs a MPC look-up.

Figure 5B:
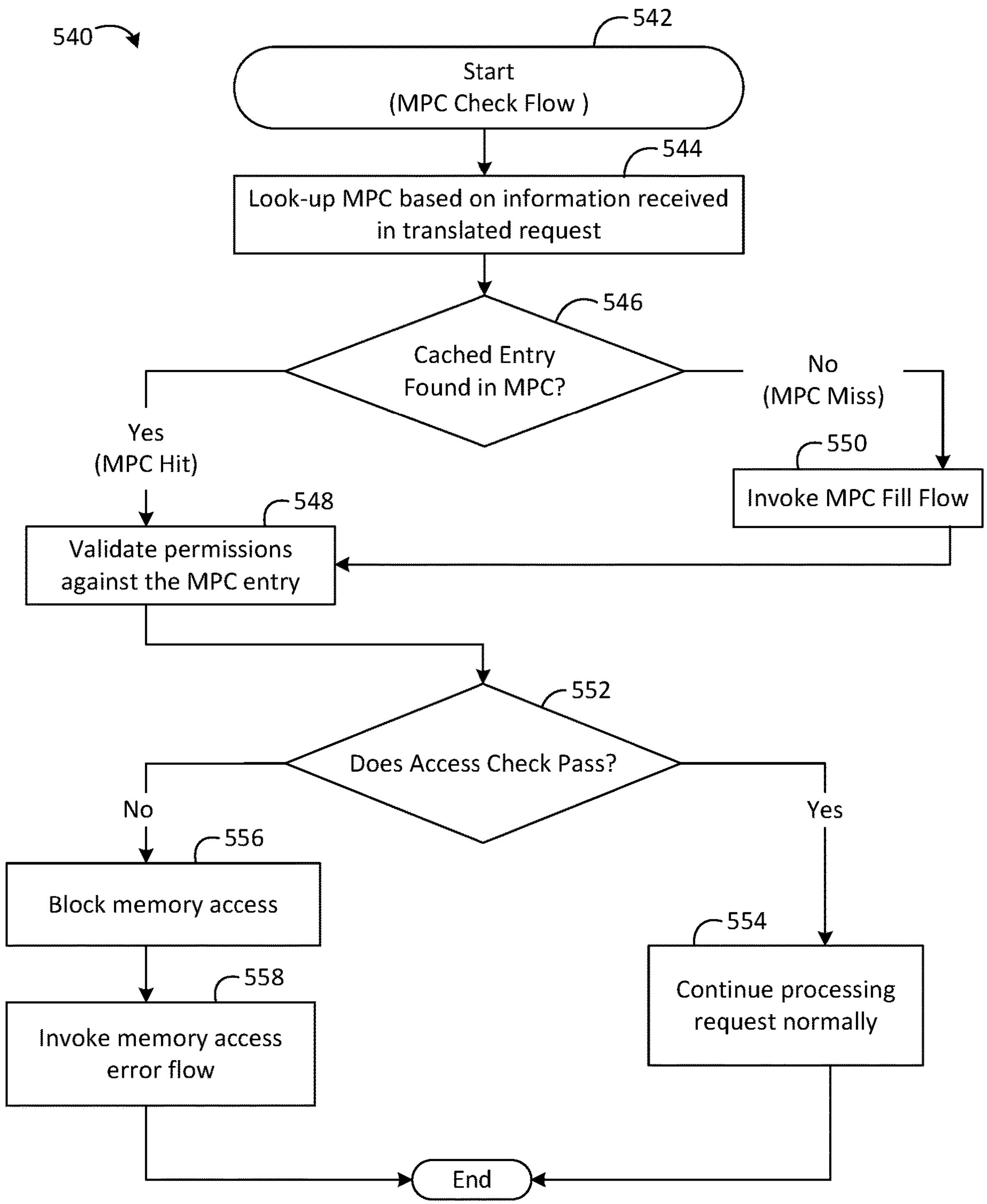
FIG. 5B is a flow chart of another example of a method according to an embodiment.

With reference to FIG. 5B, an embodiment of a method 540 may start at box 542 for a MPC check flow. The method 540 includes looking up the MPC based on information received in a translated request at box 544. If the matching entry is found in the MPC at box 546 (e.g., indicating a MPC hit), the method 540 includes validating the permissions against the matched MPC entry at box 548. For example, the target device compares the permissions stored in the MPC against the access rights requested by the memory request and either memory access is granted or is blocked (e.g., as described in further detail below). For example, a matching entry is found when the inbound request has the same Source-RID, PASID, etc., and address (e.g., at a page granularity) of an existing entry in the MPC.

If the matching entry is not found at box 546 (e.g., indicating a MPC miss), the method 540 includes invoking a MPC Fill flow at box 550 (e.g., to fill in the missing information), before proceeding to box 548. If the access check passes at box 552, the method 540 continues to processing the request normally at box 554. Otherwise, the method 540 proceeds to blocking the memory access at box 556 and invoking a memory access error flow at box 558.

Figure 6:
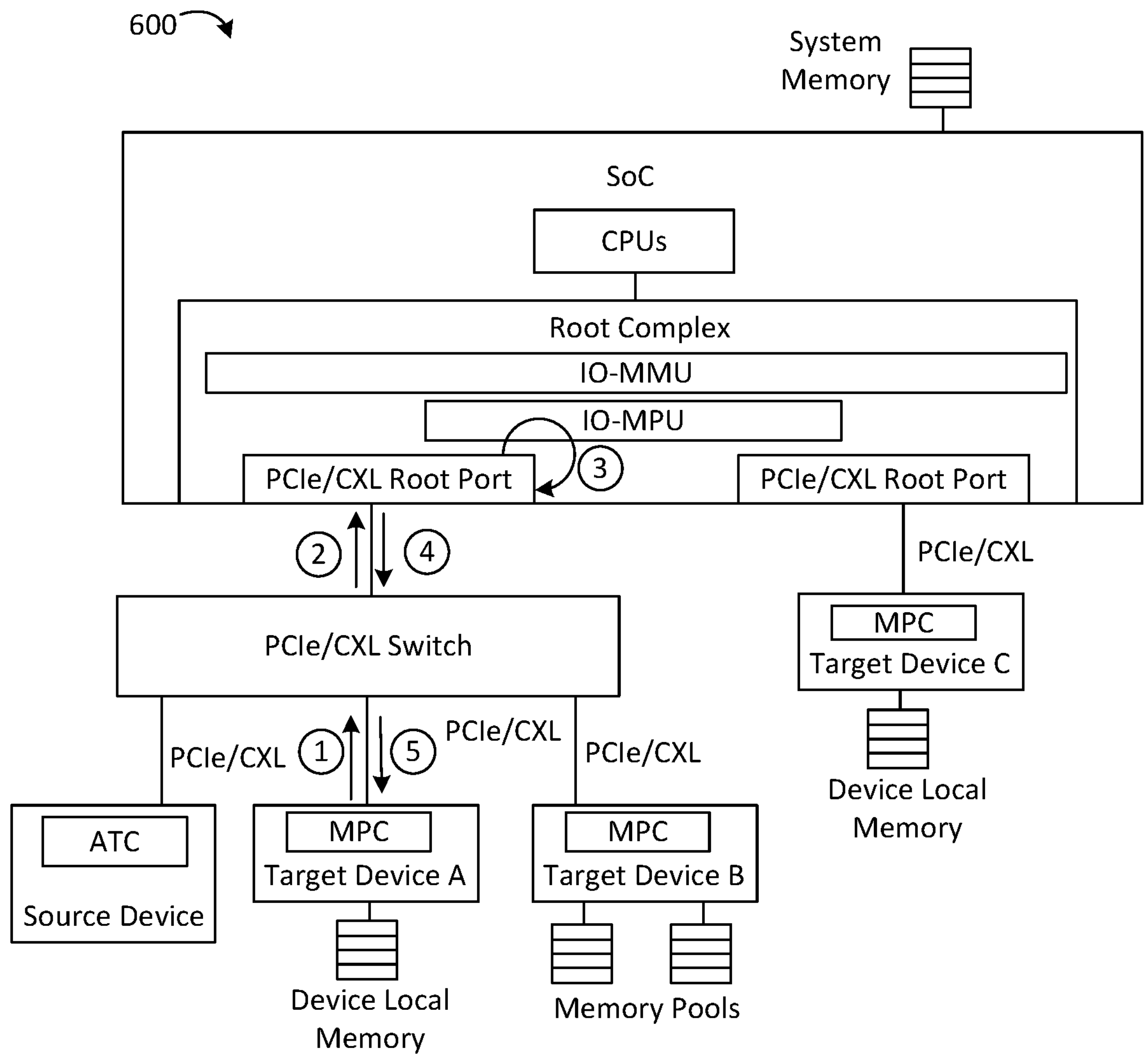
FIG. 6 is a block diagram of another example of a distributed computing system according to an embodiment.

With reference to FIG. 6, an embodiment of a distributed computing system 600 may be similarly configured as the system 400. In an example MPC Fill flow, a target device sends a "MPC Fill Request" upstream (e.g., at numbered arrows 1, 2) towards the IO-MPU. Then the PCIe/CXL Root Port works with the IO-MPU to acquire the page-permissions (e.g., at numbered arrow 3), and the PCIe/CXL Root Port returns a "MPC Fill Response" downstream to the target device (e.g., at numbered arrows 4, 5). In some embodiments, the IO-MPU looks-up and/or walks the permission tables setup by system software based on the information received in MPC Fill Request (e.g., Source-RID, optionally PASID, Address, . . . ) to help generate the MPC Fill Response (e.g., working with the PCIe/CXL Root Port). If the MPC Fill Request straddles more than one page, the IO-MPU can respond with more than one fill response to fill multiple MPC entries in the target device. The target device can freely break a page-size that is bigger than the supported page-sizes in its MPC into multiple entries, but generally supports at least a 4 KB page-size.

Devices will generally size the MPC proportional to the memory pool on the device, the page-size supported by the device, and the expected page-sizes used by the host. In addition, usages and performance requirements may influence the number of concurrent source devices that may make a request to a target device, requiring additional MPC entries to store their associated permissions. In some embodiments, a MPC Fill Request may include the following information/fields listed in Table 1:

TABLE 1

| Field | Description |
|---|---|
| Source Requester-ID | Requester-ID of source device that sent the memory access request to the target device |
| Target Requester-ID | Requester-ID of the target device that is sending the MPC Fill Request |
| PASID Info | PASID valid bit and PASID value (if valid) |
| Address | Address received in the memory access request |
| Length | Length of access required |
| Tag | Tag value |

In some embodiments, a MPC Fill Response may include the following information/fields listed in Table 2:

TABLE 2

| Field | Description |
|---|---|
| Completer-ID | Requester-ID of PCIe/CXL Root Port starting the I/O hierarchy where the target device is connected |
| Requester-ID | Requester-ID of PCIe/CXL device who initiated the MPC Fill Request |
| Completion Status | Completion status (Success, Unsupported Request/UR, Completer Abort/CA, etc.) |
| Tag | Tag value received in the MPC Fill Request |
| Page Permissions | Applicable permissions (R, W, etc.) |
| Page Size | The size of the page (4 KB, 16 KB, etc.) |

Figure 7:
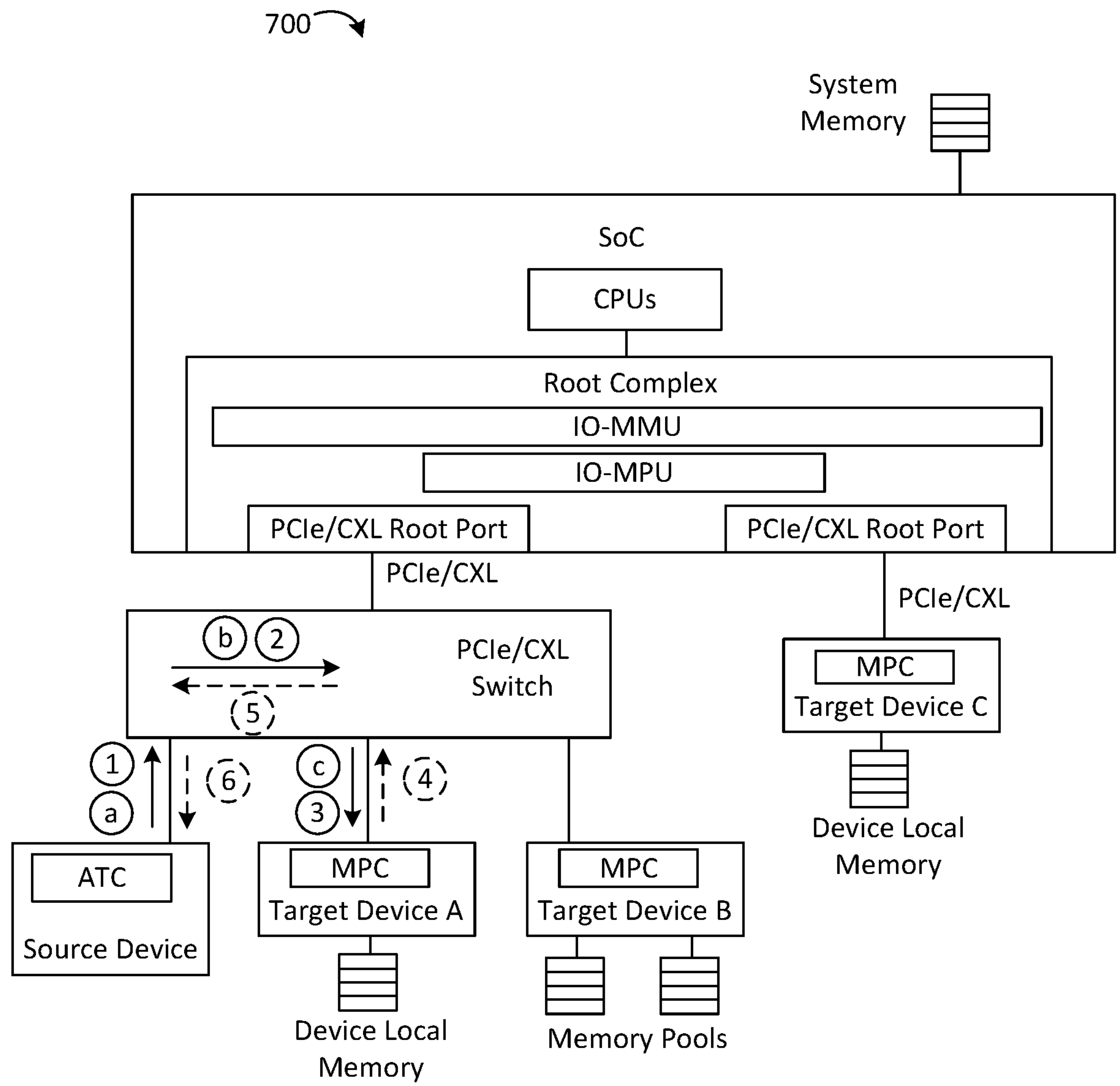
FIG. 7 is a block diagram of another example of a distributed computing system according to an embodiment.

With reference to FIG. 7, an embodiment of a distributed computing system 700 may be similarly configured as the system 400. Some embodiments of the system 700 may hold-on to (e.g. buffer) the memory request in-question, while the "MPC Fill" flow completes, and the necessary permission checks can be performed. For example, a direct P2P request from the source device to target device A (e.g., numbered arrows 1-2-3) may result in a miss in the MPC cache, followed by a MPC Fill Request to the IO-MPU. Some embodiments of the system 700 may utilize an enhanced CXL and/or a PCIe P2P protocol to utilize Non-Posted (NP) writes for P2P requests. For example, a NP write may be returned from target device A to the source device with a re-try message (e.g., numbered arrows 4-5-6). In this example, the target device may return a re-try to the source device in the case of a MPC miss, thereby simplifying the device design to not buffer (e.g. hold-on to) the pending transaction. In some embodiments, the target device may also return hold-off information (e.g., wait time, queue-depth, etc.) along with the re-try message, enabling the source device to hold-off for a small period while the target device fills-up the MPC (e.g., instead of the source device sending new requests and receiving multiple re-tries). In some embodiments, additionally or alternatively, the target device may notify the source device after the MPC is filled (e.g., the target device gives a go-ahead to the source device) to enable the source device to re-submit the request.

Figure 8A:
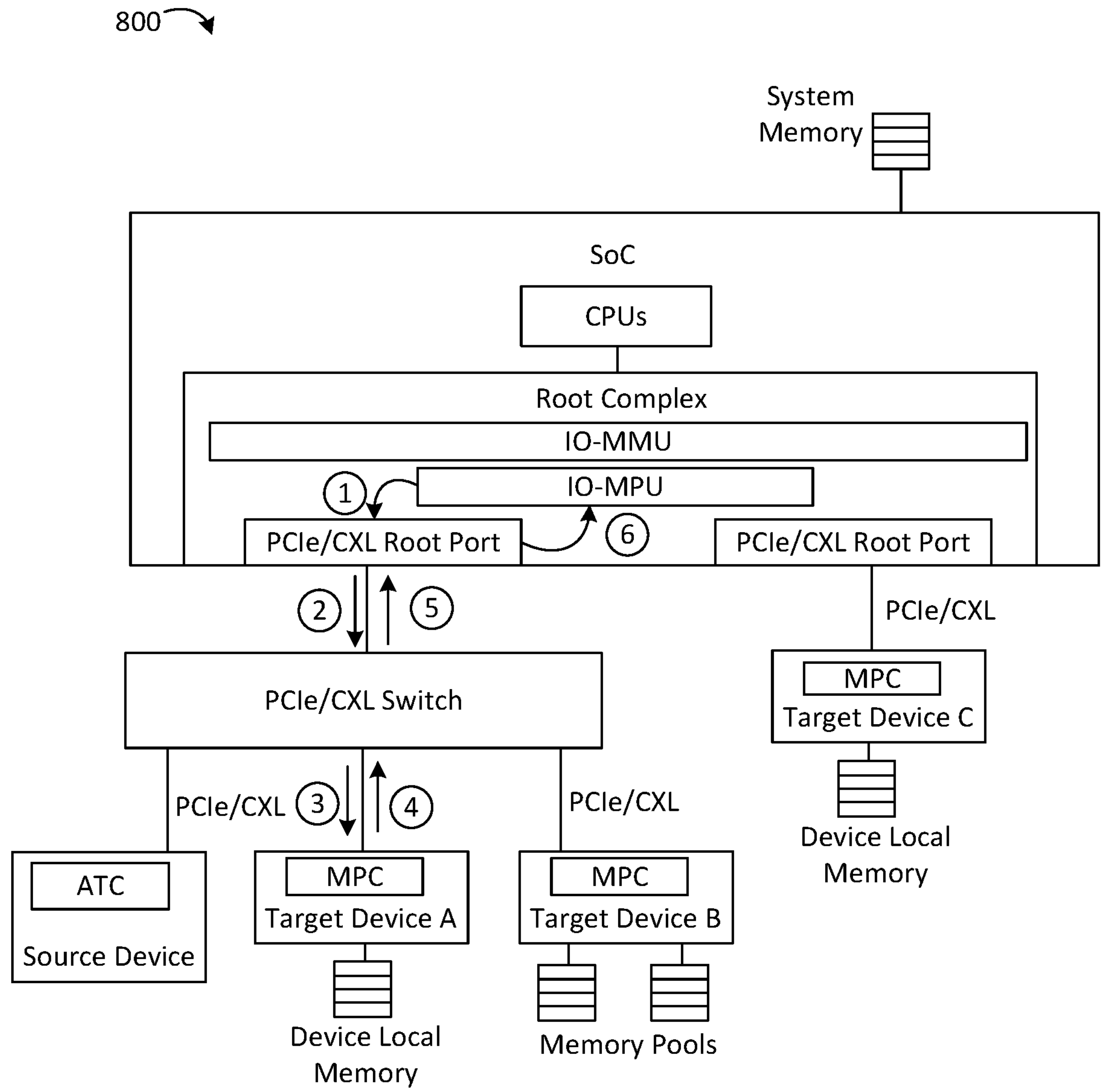
FIG. 8A is a block diagram of another example of a distributed computing system according to an embodiment.

With reference to FIG. 8A, an embodiment of a distributed computing system 800 may be similarly configured as the system 400. Because the MPC caches page permissions and ownership information, system software may need a way to invalidate cache-lines/entries in MPC when permissions/attributes associated with the page get modified. Some embodiments may include the following messages between the IO-MPU and the MPC: (1) a MPC Invalidation Request; and (2) a MPC Invalidation Response. System software may modify permissions tables used by the IO-MPU (e.g., in some embodiments, the Host Permission Tables), and then queue invalidations associated with caches in the IO-MPU and for each of the MPCs. A target device will receive such an invalidation request in the form of a "MPC Invalidation Request" (e.g., numbered arrows 1-2-3). The target device then invalidates cache-line(s)/entries in MPC based on the criteria specified in the invalidation request, and sends back a "MPC Invalidation Response" (e.g., numbered arrows 4-5-6) upstream to the IO-MPU.

In some embodiments, a MPC Invalidation Request may include the following information/fields listed in Table 3:

TABLE 3

| Field | Description |
|---|---|
| Requester-ID | Requester-ID of device implementing MPC |
| Invalidation Type | RID-granular, RID + PASID-granular, HPA-granular, etc. |
| Invalidation Info | RID: for RID-granular<br>RID + PASID: for RID + PASID-granular<br>HPA: Address with (Size) field encoded |
| Invalidation Tag | Tag value |

In some embodiments, a MPC Invalidation Response may include the following information/fields listed in Table 4:

TABLE 4

| Field | Description |
|---|---|
| Requester-ID | Requester-ID of device implementing MPC |
| Invalidation Tag | Tag received in MPC Invalidation Request |

Table 5 list examples of information used in connection with various tags for a MPC:

TABLE 5

| Tag type | Information used |
|---|---|
| Lookup | Source Requester-ID<br>PASID (when the request is with PASID)<br>Address |
| Invalidation | Source Requester-ID<br>Requester-ID + PASID<br>HPA |

Figure 8B:
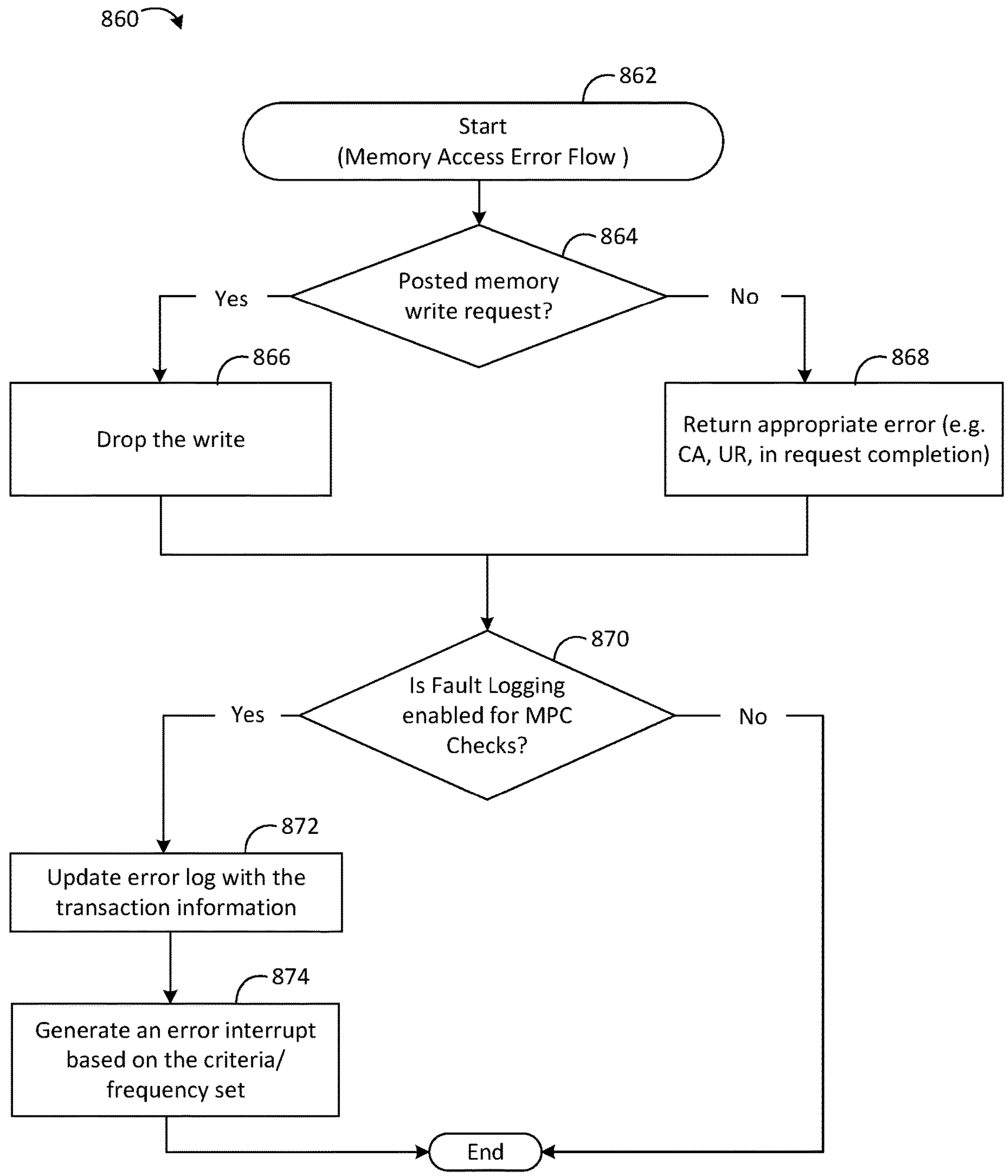
FIG. 8B is a flow chart of another example of a method according to an embodiment.

With reference to FIG. 8B, an embodiment of a method 860 for handing memory access errors starts at box 862, when the memory access error flow is invoked. The method 860 may include determining if the memory access error corresponds to a posted memory write request at box 864 and, if so, dropping the write at box 866, or otherwise returning an appropriate error response (UR, CA, etc.) to the source device at box 868 for other types of requests.

Some embodiments may further include an extension to enable error logging capabilities. For example, some embodiments of the method 860 may further include determining if fault logging is enabled for MPC checks at box 870 and, if so, proceeding to update an error log with the transaction information at box 872 and generating an error interrupt based on the criteria and/or frequency set at box 874.

In some embodiments, a target device provides a register or a set of registers capturing faulted transaction(s) information. In some embodiments, a target device may provide a register where system software can configure a memorybacked error log (i.e. error log stored in memory) and its corresponding size. In some embodiments, if fault logging is enabled, a target device may generate an error interrupt for each faulted transaction. Alternatively, in some embodiments the error interrupt may be generated based on criteria specified by the system software (e.g., when error log reaches a system software configured threshold, or after every N errors, etc.). In some embodiments, the IO-MPU provides a hint/preference along with the MPC Fill Response message on whether to log an error for access violation on a particular MPC entry combination or not.

Because a MPC miss will result into additional memory access latency (e.g., roundtrip latency of sending a MPC Fill Request and receiving a MPC Fill Response) for incoming memory requests, some embodiments may pre-configure one or more memory ranges in the MPC along with appropriate permissions and ownership info. Such pre-configuration may enable a device to perform coarse-grain memory protection checks and will relax the burden of caching/acquiring permissions for each page-domain combination. In some embodiments, where the MPC is implemented also by the PCIe/CXL switches, a configuration may enable the switches with an ability to serve a “MPC Fill Request” closer to the device instead of requiring going all the way to the IO-MPU.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10A:
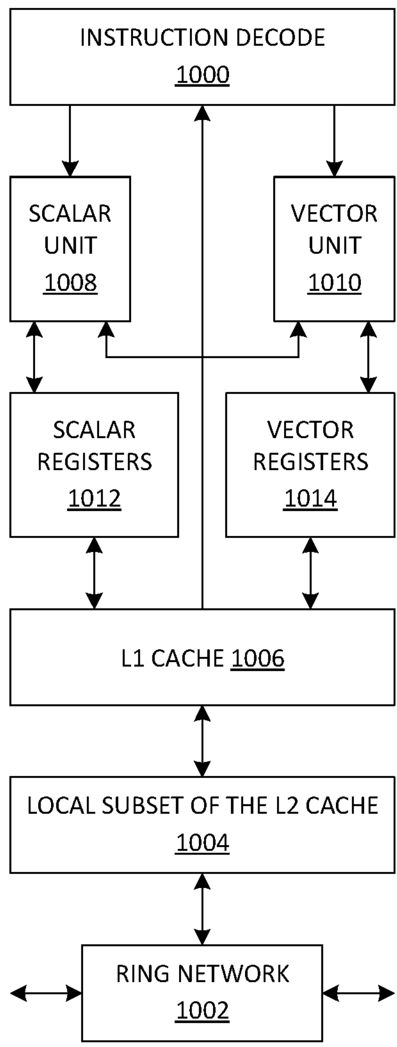
FIGS. 10A-B illustrate a block diagram of a more specific exemplary in-order core architecture, which core would be one of several logic blocks (including other cores of the same type and/or different types) in a chip.
Figure 10B:
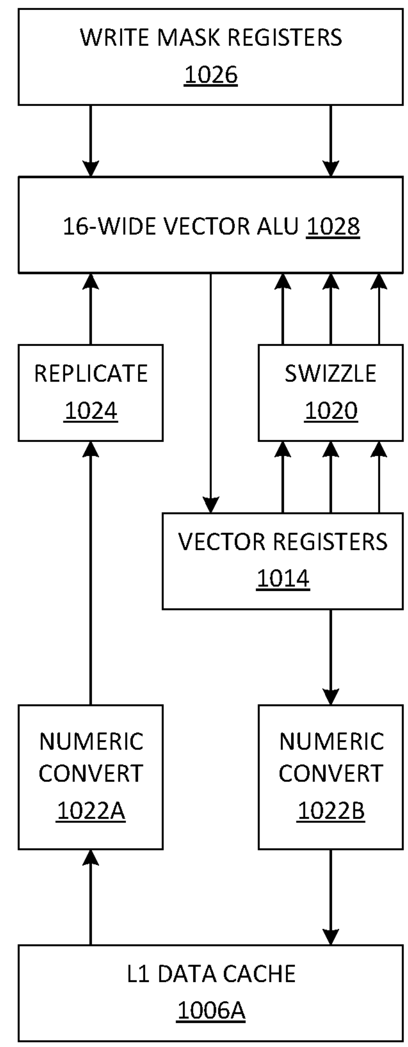

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
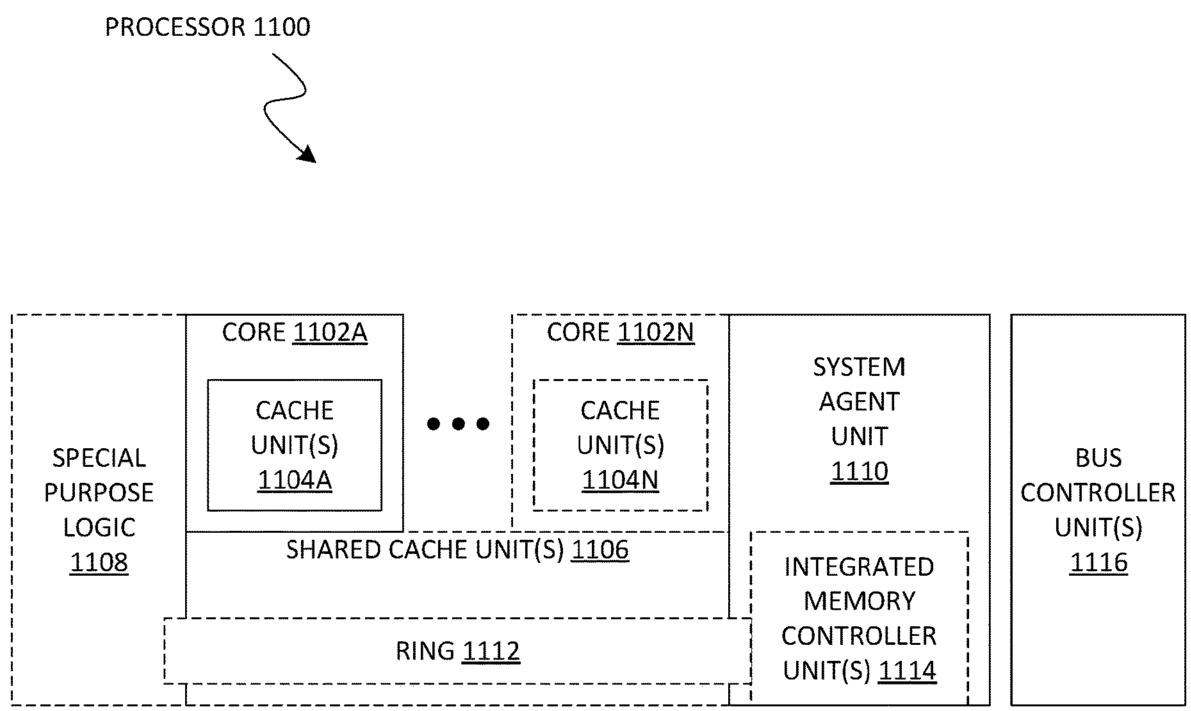
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
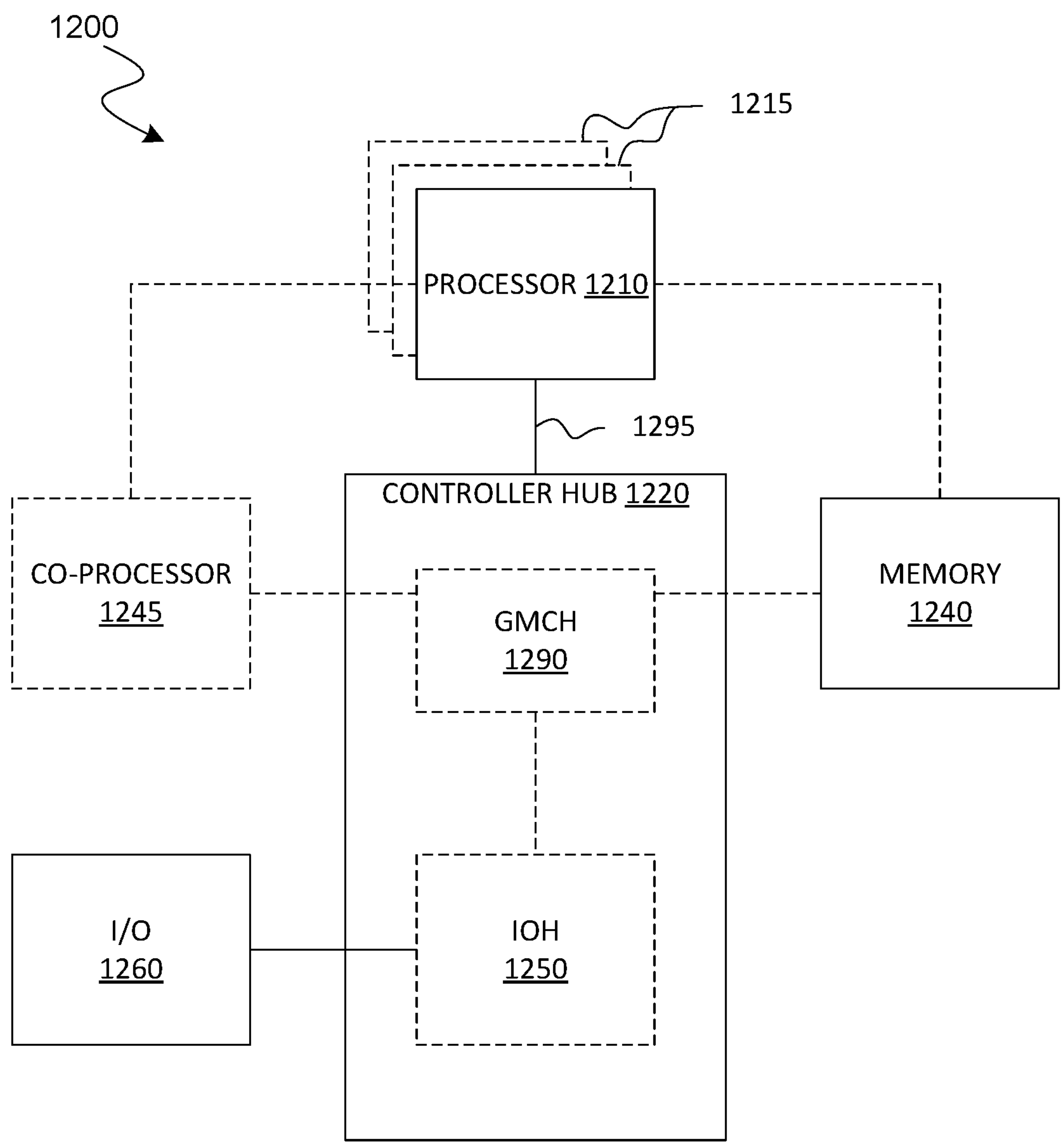
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
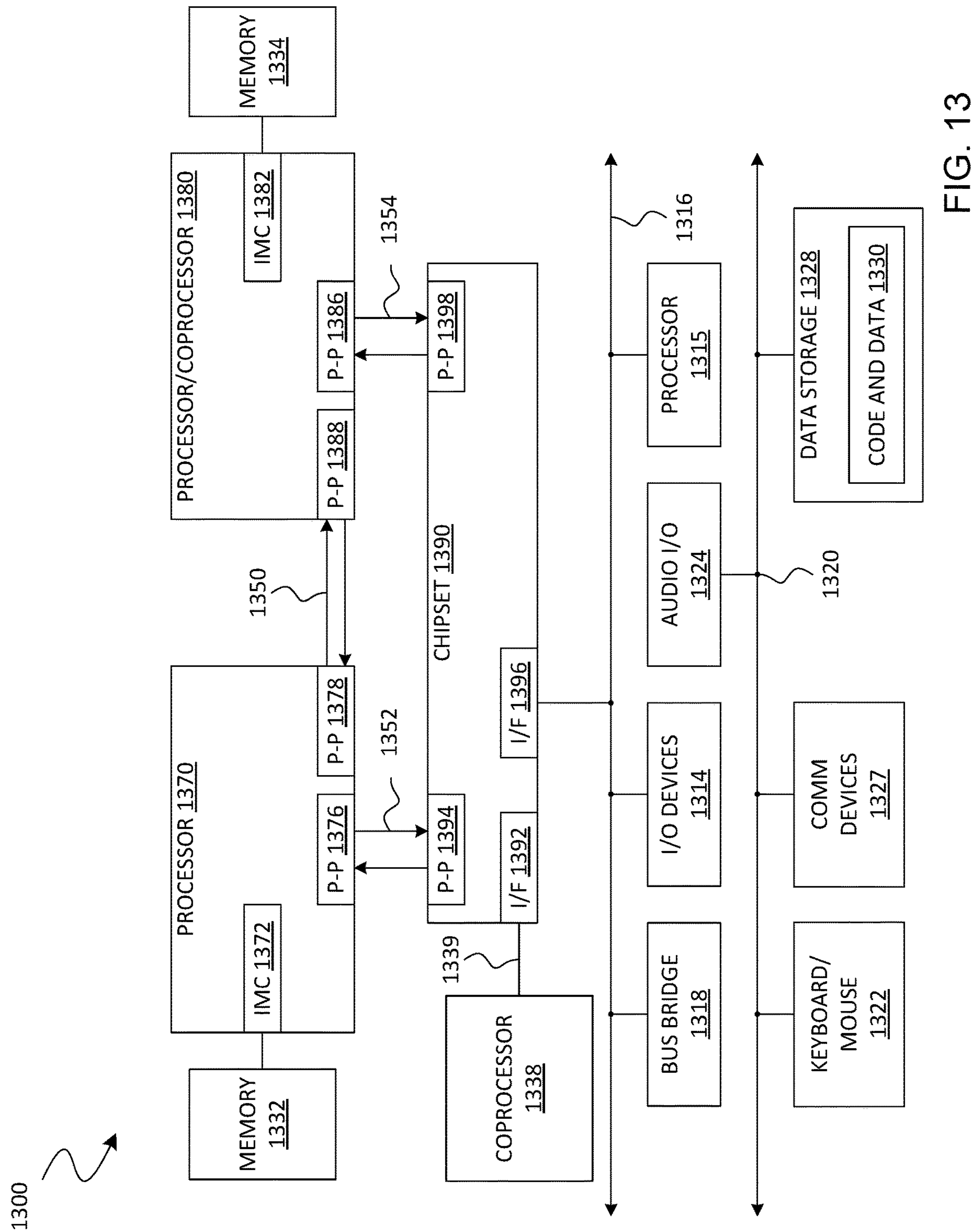

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
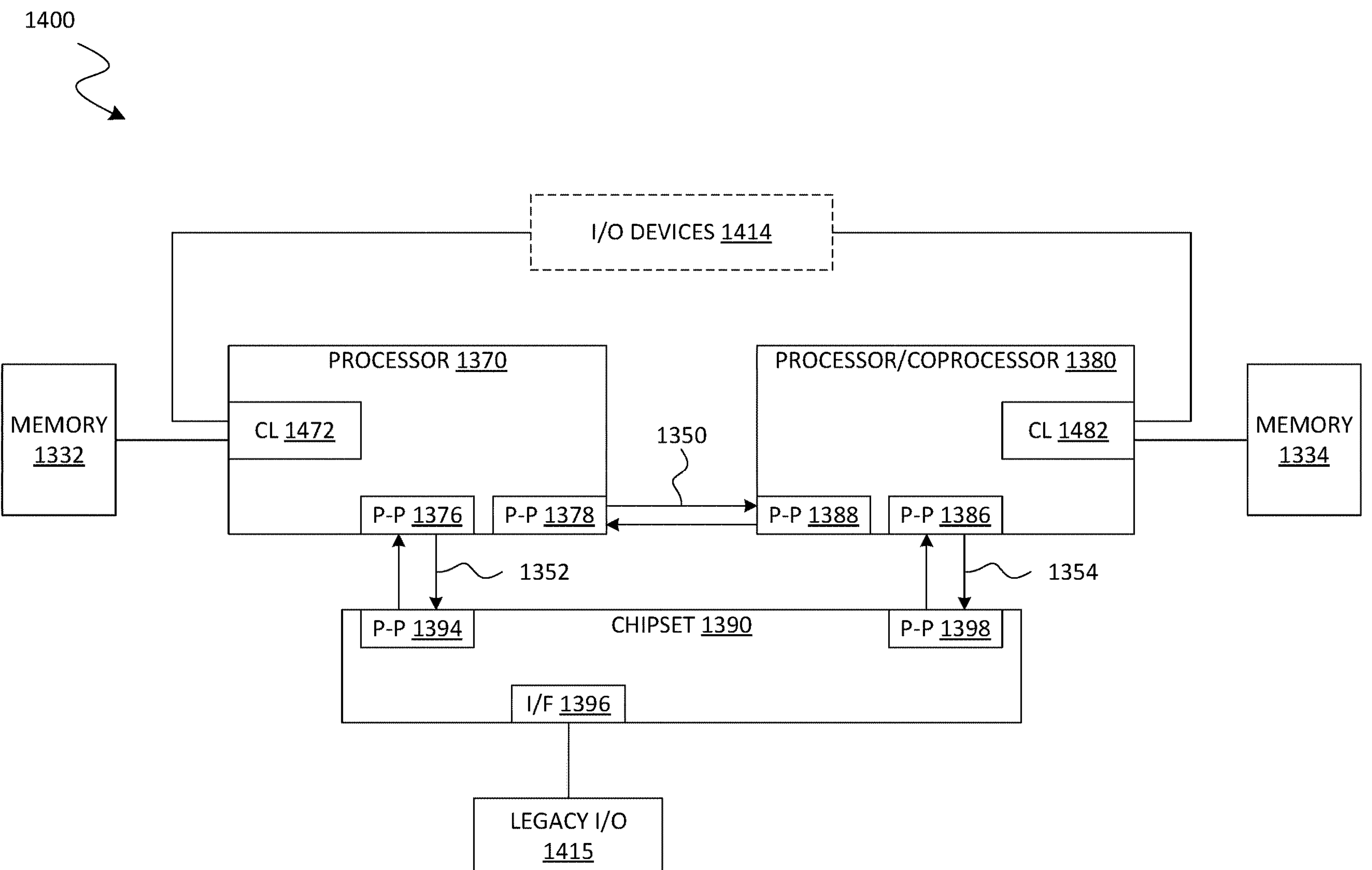

Referring now to FIG. 14, shown is a block diagram of a second more specific exemplary system 1400 in accordance with an embodiment of the present invention Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
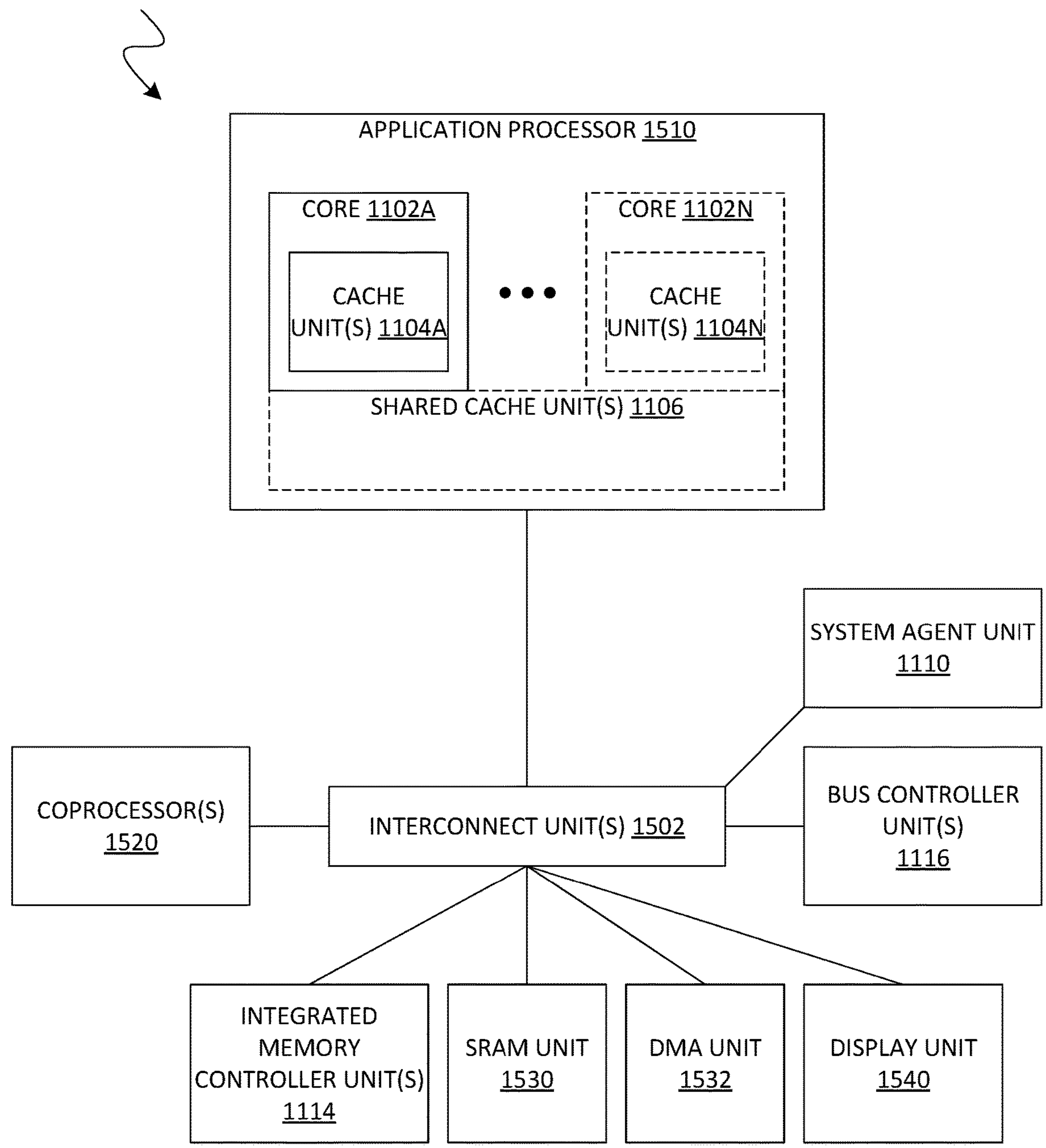

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
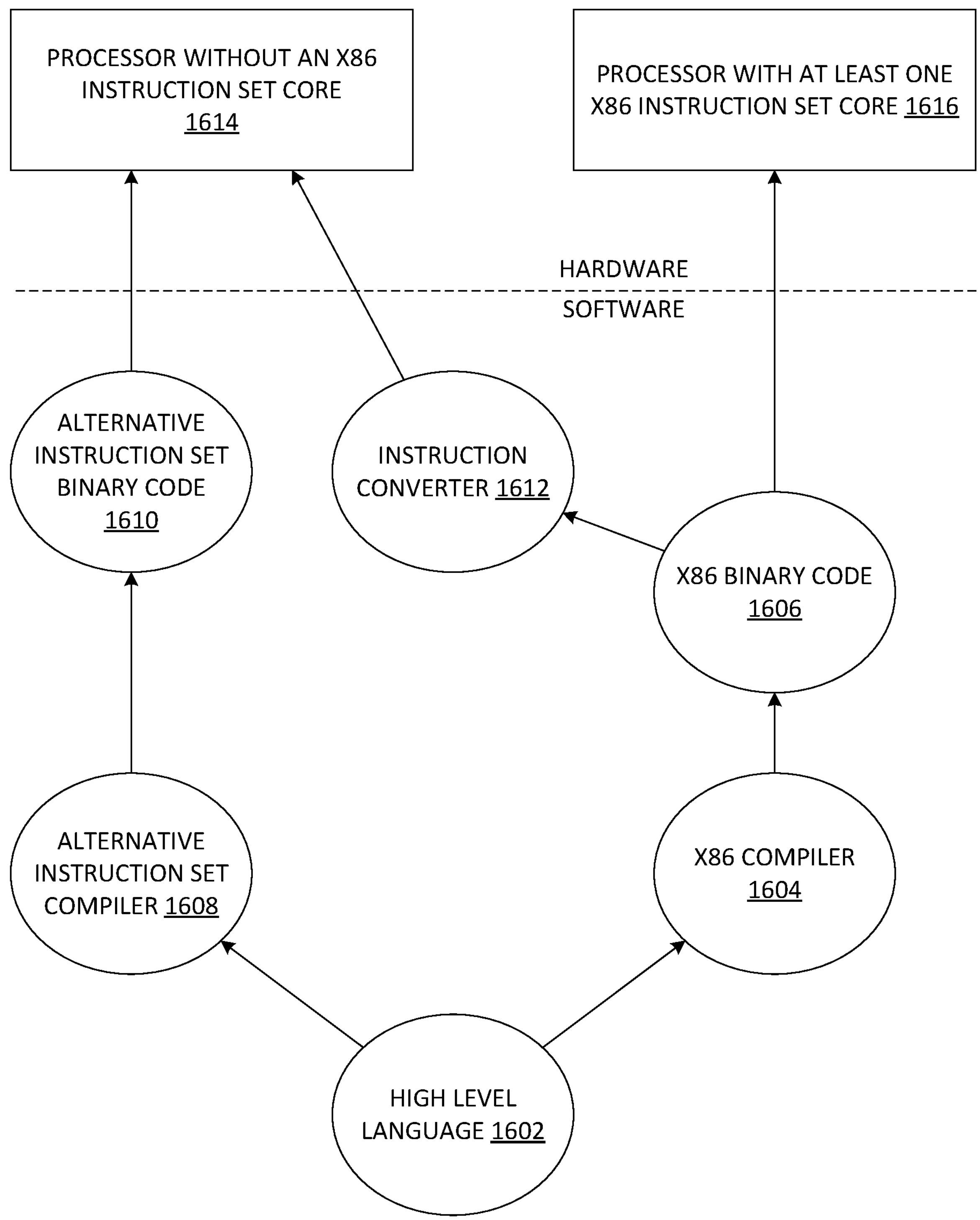
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

ADDITIONAL NOTES AND EXAMPLES

Example 1 includes an apparatus, comprising a memory protection cache to store memory protection information for a non-host memory, and circuitry coupled to the memory protection cache to perform one or more memory protection checks on a translated access request for the non-host memory based on the stored memory protection information.

Example 2 includes the apparatus of Example 1, wherein the circuitry is further to synchronize the stored memory protection information with a memory protection unit of a host.

Example 3 includes the apparatus of Example 2, wherein the circuitry is further to provide secure direct peer-to-peer memory access to the non-host memory without intervention by the host (e.g., to bypass a root port of the host for the translated access request for the non-host memory).

Example 4 includes the apparatus of any of Examples 2 to 3, wherein the circuitry is further to block or allow a direct P2P memory access request for the non-host memory based on the memory protection information stored in the MPC.

Example 5. The apparatus of any of Examples 2 to 4, wherein the circuitry is further to determine if the translated access request comes from the host, and, if so determined, bypass the one or more memory protection checks on the translated access request.

Example 6 includes the apparatus of any of Examples 2 to 5, wherein the circuitry is further to determine if the translated access request misses the memory protection cache based on information received in the translated access request, and, if so determined, request the memory protection unit of the host to fill in memory protection information for the translated access request.

Example 7 includes the apparatus of Example 6, wherein the circuitry is further to notify a requestor to retry the translated access request that misses the memory protection cache, along with hold-off information.

Example 8 includes an integrated circuit comprising circuitry to store memory protection information for a non-host memory in a memory protection cache, and perform one or more memory protection checks on a translated access request for the non-host memory based on the stored memory protection information.

Example 9 includes the integrated circuit of Example 8, wherein the circuitry is further to synchronize the stored memory protection information with a memory protection unit of a host.

Example 10 includes the integrated circuit of Example 9, wherein the circuitry is further to provide secure direct peer-to-peer memory access to the non-host memory without intervention by the host.

Example 11 includes the integrated circuit of any of Examples 9 to 10, wherein the circuitry is further to bypass a root port of the host for the translated access request for the non-host memory.

Example 12 includes the integrated circuit of any of Examples 9 to 11, wherein the circuitry is further to determine if the translated access request comes from the host, and, if so determined, bypass the one or more memory protection checks on the translated access request.

Example 13 includes the integrated circuit of any of Examples 9 to 12, wherein the circuitry is further to determine if the translated access request misses the memory protection cache based on information received in the translated access request, and, if so determined, request the memory protection unit of the host to fill in memory protection information for the translated access request.

Example 14 includes the integrated circuit of Example 13, wherein the circuitry is further to notify a requestor to retry the translated access request that misses the memory protection cache, along with hold-off information.

Example 15 includes a method, comprising storing memory protection information for a non-host memory in a memory protection cache, and performing one or more memory protection checks on a translated access request for the non-host memory based on the stored memory protection information.

Example 16 includes the method of Example 15, further comprising synchronizing the stored memory protection information with a memory protection unit of a host.

Example 17 includes the method of Example 16, further comprising providing secure direct peer-to-peer memory access to the non-host memory without intervention by the host.

Example 18 includes the method of any of Examples 16 to 17, further comprising bypassing a root port of the host for the translated access request for the non-host memory.

Example 19 includes the method of any of Examples 16 to 18, further comprising determining if the translated access request comes from the host, and, if so determined, bypassing the one or more memory protection checks on the translated access request.

Example 20 includes the method of any of Examples 16 to 19, further comprising determining if the translated access request misses the memory protection cache based on information received in the translated access request, and, if so determined, requesting the memory protection unit of the host to fill in memory protection information for the translated access request.

Example 21 includes the method of Example 20, further comprising notifying a requestor to retry the translated access request that misses the memory protection cache, along with hold-off information.

Example 22 includes an apparatus, comprising means for storing memory protection information for a non-host memory in a memory protection cache, and means for performing one or more memory protection checks on a translated access request for the non-host memory based on the stored memory protection information.

Example 23 includes the apparatus of Example 22, further comprising means for synchronizing the stored memory protection information with a memory protection unit of a host.

Example 24 includes the apparatus of Example 23, further comprising means for providing secure direct peer-to-peer memory access to the non-host memory without intervention by the host.

Example 25 includes the apparatus of any of Examples 23 to 24, further comprising means for bypassing a root port of the host for the translated access request for the non-host memory.

Example 26 includes the apparatus of any of Examples 23 to 25, further comprising means for determining if the translated access request comes from the host, and, if so determined, means for bypassing the one or more memory protection checks on the translated access request.

Example 27 includes the apparatus of any of Examples 23 to 26, further comprising means for determining if the translated access request misses the memory protection cache based on information received in the translated access request, and, if so determined, means for requesting the memory protection unit of the host to fill in memory protection information for the translated access request.

Example 28 includes the apparatus of Example 27, further comprising means for notifying a requestor to retry the translated access request that misses the memory protection cache, along with hold-off information.

Example 29 includes at least one non-transitory machine readable medium comprising a plurality of instructions that, in response to being executed on a computing device, cause the computing device to store memory protection information for a non-host memory in a memory protection cache, and perform one or more memory protection checks on a translated access request for the non-host memory based on the stored memory protection information.

Example 30 includes the at least one non-transitory machine readable medium of

Example 29, comprising a plurality of further instructions that, in response to being executed on the computing device, cause the computing device to synchronize the stored memory protection information with a memory protection unit of a host.

Example 31 includes the at least one non-transitory machine readable medium of

Example 30, comprising a plurality of further instructions that, in response to being executed on the computing device, cause the computing device to provide secure direct peer-to-peer memory access to the non-host memory without intervention by the host.

Example 32 includes the at least one non-transitory machine readable medium of any of Examples 30 to 31, comprising a plurality of further instructions that, in response to being executed on the computing device, cause the computing device to bypass a root port of the host for the translated access request for the non-host memory.

Example 33 includes the at least one non-transitory machine readable medium of any of Examples 30 to 32, comprising a plurality of further instructions that, in response to being executed on the computing device, cause the computing device to determine if the translated access request comes from the host, and, if so determined, bypass the one or more memory protection checks on the translated access request.

Example 34 includes the at least one non-transitory machine readable medium of any of Examples 30 to 33, comprising a plurality of further instructions that, in response to being executed on the computing device, cause the computing device to determine if the translated access request misses the memory protection cache based on information received in the translated access request, and, if so determined, request the memory protection unit of the host to fill in memory protection information for the translated access request.

Example 35 includes the at least one non-transitory machine readable medium of

Example 34, comprising a plurality of further instructions that, in response to being executed on the computing device, cause the computing device to notify a requestor to retry the translated access request that misses the memory protection cache, along with hold-off information.

Example 36 includes an integrated circuit comprising circuitry to store memory protection information for a host memory in an input/output memory protection unit (IO-MPU), and synchronize the stored memory protection information with a memory protection cache (MPC) of a device communicatively coupled to the host.

Example 37 includes the integrated circuit of Example 36, wherein the circuitry is further to receive a MPC fill request at the IO-MPU from the device.

Example 38 includes the integrated circuit of Example 37, wherein the circuitry is further to perform a host-permission table walk and validate access permissions at the IO-MPU in response to the MPC fill request, and return information from the IO-MPU to the device in a form of a MPC fill response.

Example 39 includes the integrated circuit of any of Examples 36 to 38, wherein the circuitry is further to receive a request at the IO-MPU from system software to invalidate MPC information.

Example 40 includes the integrated circuit of Example 39, wherein the circuitry is further to generate a MPC invalidation request to the device in response to the request, and receive a MPC invalidation response from the device.

Example 41 includes the integrated circuit of Example 40, wherein the circuitry is further to one or more of update tracking information and notify the system software about the MPC invalidation response.

Example 42 include the integrated circuit of any of Examples 36 to 41, wherein the host memory comprises system memory.

Techniques and architectures for a MPC are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus, comprising:

a memory protection cache to store memory protection information while a first device and a non-host memory device are coupled to each other via a network switch, and while the first device and the non-host memory device are each coupled, via the network switch, to a root complex of a host, wherein the non-host memory device is to comprise the apparatus; and circuitry coupled to the memory protection cache, the circuitry to:

synchronize the memory protection information stored at the memory protection cache with a memory protection unit of the root complex, wherein the memory protection information is to identify memory access permissions at a page-level granularity;

perform one or more memory protection checks on a translated peer-to-peer memory access request based on the memory protection information stored in the memory protection cache, wherein the one or more memory protection checks are to determine a memory access permission of the first device; and block or allow the translated peer-to-peer memory access request based on the one or more memory protection checks;

wherein:

the apparatus is to receive the translated peer-to-peer memory access request from the first device via the network switch;

the translated peer-to-peer memory access request comprises a host physical address to be targeted; and a communication of the translated peer-to-peer memory access request from the first device to the apparatus is to bypass the root complex of the host.

2. The apparatus of claim 1, wherein the stored memory protection information is to identify the memory access permissions further at one of a source requester identifier granularity, a process address space identifier granularity, or a domain-id granularity.

3. The apparatus of claim 1, wherein the circuitry is further to:

provide secure direct peer-to-peer access to the non-host memory device without intervention by the host.

4. The apparatus of claim 1, wherein the circuitry is further to:

determine if another translated access request comes from the host; and, if so determined, bypass one or more other memory protection checks on the other translated access request.

5. The apparatus of claim 2, wherein the circuitry is further to:

determine if the translated peer-to-peer memory access request misses the memory protection cache based on information received in the translated peer-to-peer memory access request; and, if so determined, request the memory protection unit of the host to fill in respective memory protection information for the translated peer-to-peer memory access request.

6. The apparatus of claim 5, wherein the circuitry is further to:

notify a requestor to retry the translated peer-to-peer memory access request that misses the memory protection cache, along with hold-off information.

7. An integrated circuit comprising circuitry to:

store memory protection information in an input/output memory protection unit (IO-MPU) which is at a root complex of a host; and synchronize the stored memory protection information with a memory protection cache (MPC) of a non-host memory device which is communicatively coupled, via a network switch, to the root complex of the host, wherein the memory protection information is to identify memory access permissions at a page-level granularity.

8. The integrated circuit of claim 7, wherein the circuitry is to:

receive a MPC fill request at the IO-MPU from the non-host memory device.

9. The integrated circuit of claim 8, wherein the circuitry is to:

perform a host-permission table walk and validate access permissions at the IO-MPU in response to the MPC fill request; and return information from the IO-MPU to the non-host memory device in a form of a MPC fill response.

10. The integrated circuit of claim 7, wherein the circuitry is further to:

receive a request at the IO-MPU from system software to invalidate MPC information.

11. The integrated circuit of claim 10, wherein the circuitry is further to:

generate a MPC invalidation request to the non-host memory device in response to the request; and receive a MPC invalidation response from the non-host memory device.

12. The integrated circuit of claim 11, wherein the circuitry is further to:

one or more of update tracking information or notify the system software about the MPC invalidation response.

13. The integrated circuit of claim 7, wherein the memory protection information-is to protect a system memory.

14. A method, comprising:

storing memory protection information in a memory protection cache of a non-host memory device, wherein a first device and the non-host memory device are coupled to each other via a network switch, and wherein the first device and the non-host memory device are each coupled, via the network switch, to a root complex of a host; and at the non-host memory device:

synchronizing the memory protection information stored at the memory protection cache with a memory protection unit of the root complex, wherein the memory protection information identifies memory access permissions at a page-level granularity;

performing one or more memory protection checks on a translated peer-to-peer memory access request based on the memory protection information stored in the memory protection cache; and block or allow the translated peer-to-peer memory access request based on the one or more memory protection checks;

wherein:

the non-host memory device receives the translated peer-to-peer memory access request from the first device via the network switch;

the translated peer-to-peer memory access request comprises a host physical address to be targeted; and a communication of the translated peer-to-peer memory access request from the first device to the non-host memory device bypasses the root complex of the host.

15. The method of claim 14, wherein the stored memory protection information identifies the memory access permissions further at one of a source requester identifier granularity, a process address space identifier granularity, or a domain-id granularity.

16. The method of claim 14, further comprising:

providing secure direct peer-to-peer access to the non-host memory device without intervention by the host.

17. The method of claim 15, further comprising:

determining if another translated access request comes from the host; and, if so determined, bypassing one or more other memory protection checks on the other translated access request.

18. The method of claim 15, further comprising:

determining if the translated peer-to-peer memory access request misses the memory protection cache based on information received in the translated peer-to-peer memory access request; and, if so determined, requesting the memory protection unit of the host to fill in respective memory protection information for the translated peer-to-peer memory access request.

19. The method of claim 18, further comprising: notifying a requestor to retry the translated peer-to-peer memory access request that misses the memory protection cache, along with hold-off information.

* * * * *